United States Patent
Li et al.

(10) Patent No.: US 10,375,612 B2
(45) Date of Patent: Aug. 6, 2019

(54) CORE NETWORK DEVICE, ACCESS NETWORK DEVICE, AND DATA OFFLOADING METHOD AND SYSTEM

(71) Applicant: HUAWEI TECHNOLOGIES CO., LTD., Shenzhen (CN)

(72) Inventors: Bingzhao Li, Beijing (CN); Jian Zhang, Beijing (CN); Zhenxing Hu, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 348 days.

(21) Appl. No.: 15/213,894

(22) Filed: Jul. 19, 2016

(65) Prior Publication Data

US 2016/0330669 A1 Nov. 10, 2016

Related U.S. Application Data

(63) Continuation of application No. PCT/CN2014/070930, filed on Jan. 20, 2014.

(51) Int. Cl.
*H04W 36/22* (2009.01)
*H04W 72/10* (2009.01)
(Continued)

(52) U.S. Cl.
CPC ......... *H04W 36/22* (2013.01); *H04L 67/2861* (2013.01); *H04W 16/14* (2013.01);
(Continued)

(58) Field of Classification Search
None
See application file for complete search history.

(56) References Cited

U.S. PATENT DOCUMENTS

2010/0296497 A1    11/2010   Karaoguz et al.
2010/0296499 A1    11/2010   Karaoguz et al.
(Continued)

FOREIGN PATENT DOCUMENTS

CN    101909303 A    12/2010
CN    102577416 A    7/2012
(Continued)

OTHER PUBLICATIONS

International Search Report and Written Opinion dated Oct. 9, 2014 in corresponding International Patent Application No. PCT/CN2014/070930.
(Continued)

*Primary Examiner* — Kenny S Lin
(74) *Attorney, Agent, or Firm* — Staas & Halsey LLP

(57) ABSTRACT

Embodiments of the present invention provide a core network device, an access network device, and a data offloading method and system, and relate to the field of mobile communications. In the system, the access network device receives an offloading inclination indication of service data from the core network device; the access network device allocates, according to the offloading inclination indication, a transmission resource used for transmitting the service data; and the access network device transmits the service data by using the allocated transmission resource. In the present invention, quality of service (QoS) in the transmission process can be ensured even if data is offloaded by using a first resource such as an unlicensed spectrum, a transmission resource provided by Wireless Local Area Networks (WLAN), or a transmission resource provided by the secondary eNodeB.

8 Claims, 10 Drawing Sheets

(51) Int. Cl.
*H04W 76/16* (2018.01)
*H04W 16/14* (2009.01)
*H04L 29/08* (2006.01)
*H04W 28/02* (2009.01)
*H04W 72/12* (2009.01)
*H04W 84/12* (2009.01)
*H04W 88/10* (2009.01)
*H04W 36/00* (2009.01)

(52) U.S. Cl.
CPC ... *H04W 28/0257* (2013.01); *H04W 28/0268* (2013.01); *H04W 72/10* (2013.01); *H04W 72/1252* (2013.01); *H04W 72/1263* (2013.01); *H04W 76/16* (2018.02); *H04W 36/0069* (2018.08); *H04W 84/12* (2013.01); *H04W 88/10* (2013.01)

(56) References Cited

U.S. PATENT DOCUMENTS

| | | |
|---|---|---|
| 2014/0056245 A1 | 2/2014 | Qin et al. |
| 2014/0140335 A1 | 5/2014 | Wang et al. |
| 2014/0341038 A1* | 11/2014 | Lim ............ H04W 28/08 370/235 |
| 2015/0009826 A1* | 1/2015 | Ma ............ H04W 28/0268 370/235 |
| 2015/0181491 A1* | 6/2015 | Van Phan ...... H04W 28/08 370/331 |

FOREIGN PATENT DOCUMENTS

| | | |
|---|---|---|
| CN | 102638852 A | 8/2012 |
| CN | 103096474 A | 5/2013 |
| CN | 103220786 A | 7/2013 |
| CN | 103404179 A | 11/2013 |
| EP | 2 529 856 A1 | 5/2013 |
| EP | 2592856 | 5/2013 |
| EP | 2 773 141 A1 | 9/2014 |
| WO | 2012/166671 A1 | 12/2012 |

OTHER PUBLICATIONS

Extended European Search Report dated Nov. 7, 2016 in corresponding European Patent Application No. 14878666.8.
International Search Report dated Oct. 9, 2014 in corresponding International Application No. PCT/CN2014/070930.

* cited by examiner

CORE NETWORK DEVICE, ACCESS NETWORK DEVICE, AND DATA OFFLOADING METHOD AND SYSTEM

CROSS-REFERENCE TO RELATED APPLICATIONS

This application is a continuation of International Application No. PCT/CN2014/070930, filed on Jan. 20, 2014, which is hereby incorporated by reference in its entirety.

TECHNICAL FIELD

The present invention relates to the field of mobile communications, and in particular, to a core network device, an access network device, and a data offloading method and system.

BACKGROUND

A data offloading technology is a technology that service data is transmitted according to at least two transmission paths. The at least two transmission paths may be established by using different transmission resources or transmission networks of different standards.

An example in which service data is transmitted between an access network device and a terminal is used. Offloading transmission may be implemented on service data of a same service by using a licensed spectrum and an unlicensed spectrum, where the unlicensed spectrum is also referred to as a common spectrum, and any organization or person may use a current idle spectrum in the common spectrum by following a particular rule. Alternatively, offloading transmission may be implemented on service data of a same service by using a transmission resource provided by a base station and a transmission resource provided by a WLAN (Wireless Local Area Networks). Alternatively, offloading transmission may be implemented on service data of a same service by using a transmission resource provided by a primary eNodeB and a transmission resource provided by a secondary eNodeB.

In a process of implementing embodiments of the present invention, the inventor finds that the foregoing technology has at least the following problem: because the unlicensed spectrum exists dynamically, and deployment of the WLAN and the secondary eNodeB may be discontinuous, QoS (Quality of Service) in a transmission process cannot be ensured when data is offloaded by using the unlicensed spectrum, the WLAN, or the secondary eNodeB.

SUMMARY

To resolve a problem that QoS in a transmission process cannot be ensured when data is offloaded by using an unlicensed spectrum, a WLAN, or a secondary eNodeB, embodiments of the present invention provide a core network device, an access network device, and a data offloading method and system. The technical solutions are as follows:

According to a first aspect, an access network device is provided, where the device includes:

an indication receiving module, configured to receive an offloading inclination indication of service data, where the offloading inclination indication is used to indicate a scheduling inclination of the service data on a first resource, and the first resource includes a Long Term Evolution LTE carrier in an unlicensed spectrum, a transmission resource provided by a wireless local area network WLAN, or a transmission resource provided by a secondary eNodeB;

a resource allocation module, configured to allocate, according to the offloading inclination indication, a transmission resource used for transmitting the service data; and a data transmission module, configured to transmit the service data by using the allocated transmission resource.

In a first possible implementation manner of the first aspect, the offloading inclination indication includes:
prohibiting scheduling on the first resource; or
allowing scheduling on the first resource; or
preferably performing scheduling on the first resource; or
preferably performing scheduling on a non-first resource.

With reference to the first possible implementation manner of the first aspect, in a second possible implementation manner, the resource allocation module is configured to: when the offloading inclination indication is used to instruct to prohibit scheduling on the first resource, allocate a transmission resource that belongs to the non-first resource to the service data; or the resource allocation module is configured to: when the offloading inclination indication is used to instruct to preferably perform scheduling on the first resource, preferably allocate a transmission resource that belongs to the first resource to the service data; or the resource allocation module is configured to: when the offloading inclination indication is used to instruct to allow scheduling on the first resource, and the first resource is available, allocate a transmission resource that belongs to the first resource to the service data; or the resource allocation module is configured to: when the offloading inclination indication is used to instruct to preferably perform scheduling on the non-first resource, preferably allocate a transmission resource that belongs to the non-first resource to the service data.

With reference to the second possible implementation manner of the first aspect, in a third possible implementation manner, the data transmission module includes a first transmission unit, a second transmission unit, a third transmission unit, and a fourth transmission unit, where the first transmission unit is configured to: when the transmission resource allocated to the service data includes the transmission resource that belongs to the non-first resource, send, by using an LTE carrier in a licensed spectrum, data corresponding to the transmission resource that belongs to the non-first resource in the service data to a terminal;

the second transmission unit is configured to: when the transmission resource allocated to the service data includes the transmission resource that belongs to the first resource, and the first resource is the LTE carrier in the unlicensed spectrum, send, by using the LTE carrier in the unlicensed spectrum, data corresponding to the transmission resource that belongs to the first resource in the service data to a terminal;

the third transmission unit is configured to: when the transmission resource allocated to the service data includes the transmission resource that belongs to the first resource, and the first resource is the transmission resource provided by the WLAN, send data corresponding to the transmission resource that belongs to the first resource in the service data to a wireless access point of the WLAN, so that the wireless access point forwards the data to a terminal; or the fourth transmission unit is configured to: when the transmission resource allocated to the service data includes the transmission resource that belongs to the first resource, and the first resource is the transmission resource provided by the secondary eNodeB, instruct the secondary eNodeB to establish a bearer between the secondary eNodeB and a terminal, and send data corresponding to the transmission resource that belongs to the first resource in the service data to the secondary eNodeB, so that the secondary eNodeB forwards the data to the terminal by using the established bearer.

With reference to the first aspect, or the first or the second or the third possible implementation manner, in a fourth possible implementation manner, the indication receiving module is configured to receive the offloading inclination indication sent by a core network device; or the indication receiving module is configured to receive the offloading inclination indication forwarded by a core network device by using a primary eNodeB; or the indication receiving module is configured to receive the offloading inclination indication sent by a primary eNodeB, where the offloading inclination indication is generated by the primary eNodeB according to QoS information of the service data after the primary eNodeB receives the QoS information that is of the service data and is sent by a core network device.

With reference to the first aspect, or the first or the second or the third possible implementation manner, in a fifth possible implementation manner, if the service data further includes uplink service data, the device further includes an uplink indication module, where the uplink indication module is configured to send the offloading inclination indication to a terminal, so that the terminal determines, according to the offloading inclination indication, a transmission resource used for transmitting the uplink service data; or the uplink indication module is configured to send an uplink offloading inclination indication in the offloading inclination indication to a terminal, so that the terminal determines, according to the uplink offloading inclination indication, a transmission resource used for transmitting the uplink service data.

With reference to the first aspect, or the first or the second or the third possible implementation manner, in a sixth possible implementation manner, the device further includes a traffic statistics collection module and a traffic reporting module, where the traffic statistics collection module is configured to collect traffic statistics information respectively corresponding to the transmission resource that is used for transmitting the service data and belongs to the first resource and/or the transmission resource that is used for transmitting the service data and belongs to the non-first resource; and the traffic reporting module is configured to report the traffic statistics information to a core network device.

With reference to the first aspect, or the first or the second or the third possible implementation manner, in a seventh possible implementation manner, the offloading inclination indication is carried by using a specific QoS class identifier QCI value.

According to a second aspect, a core network device is provided, where the device includes:

an indication determining module, configured to determine an offloading inclination indication of service data, where the offloading inclination indication is used to indicate a scheduling inclination of the service data on a first resource, and the first resource includes a Long Term Evolution LTE carrier in an unlicensed spectrum, a transmission resource provided by a wireless local area network WLAN, or a transmission resource provided by a secondary eNodeB; and an indication sending module, configured to send the offloading inclination indication of the service data to an access network device, so that the access network device allocates, according to the offloading inclination indication, a transmission resource used for transmitting the service data, and transmits the service data by using the allocated transmission resource.

In a first possible implementation manner of the second aspect, the indication determining module includes an information acquiring unit and an indication generation unit, where the information acquiring unit is configured to acquire QoS information of the service data; and the indication generation unit is configured to generate the offloading inclination indication of the service data according to the QoS information.

With reference to the first possible implementation manner of the second aspect, in a second possible implementation manner, the indication generation unit includes:

a first generation subunit, a second generation subunit, a third generation subunit, and a fourth generation subunit, where the first generation subunit is configured to: when the QoS information includes an aggregate maximum bit rate AMBR, an allocation/retention priority ARP, and a QoS class identifier QCI, if a rate indicated by the AMBR is greater than a first threshold, a priority indicated by the ARP is less than a first priority, and a delay indicated by the QCI is greater than a second threshold, generate an offloading inclination indication used to instruct to preferably perform scheduling on the first resource;

the second generation subunit is configured to: when the QoS information includes a guaranteed bit rate GBR, generate an offloading inclination indication used to instruct to prohibit scheduling on the first resource;

the third generation subunit is configured to: when the QoS information does not include the GBR, generate an offloading inclination indication used to instruct to allow scheduling on the first resource; or the fourth generation subunit is configured to: when the QoS information does not include the GBR but includes the ARP and the QCI, if a priority indicated by the ARP is less than a second priority and a delay indicated by the QCI is less than a third threshold, generate an offloading inclination indication used to instruct to preferably perform scheduling on a non-first resource.

With reference to the second aspect, or the first or the second possible implementation manner, in a third possible implementation manner, the indication sending module is configured to send the offloading inclination indication to a primary eNodeB; or the indication sending module is configured to forward the offloading inclination indication to the secondary eNodeB by using a primary eNodeB.

With reference to the second aspect, or the first or the second possible implementation manner, in a fourth possible implementation manner, the device further includes a traffic receiving module, where the traffic receiving module is configured to receive traffic statistics information fed back by the access network device, where the traffic statistics information is fed back by the access network device after collecting traffic respectively corresponding to the transmission resource that is used for transmitting the service data and belongs to the first resource and/or the transmission resource that is used for transmitting the service data and belongs to the non-first resource.

With reference to the fourth possible implementation manner of the second aspect, in a fifth possible implementation manner, when the core network device is a mobility management entity MME, the device further includes a traffic forwarding module, where the traffic forwarding module is configured to send the traffic statistics information to a charging network element, so that the charging network element performs, according to the traffic statistics information, differential charging on the transmission resource that belongs to the first resource and/or the transmission resource that belongs to the non-first resource.

With reference to the second aspect, or the first or the second possible implementation manner, in a sixth possible implementation manner, the offloading inclination indication is carried by using a specific QoS class identifier QCI value.

According to a third aspect, an access network device is provided, where the device includes:

an information receiving module, configured to receive QoS information of service data;

a transmission allocation module, configured to allocate, according to the QoS information, a transmission resource used for transmitting the service data, where the transmission resource includes a transmission resource that belongs to a first resource and a transmission resource that belongs to a non-first resource, and the first resource includes a Long Term Evolution LTE carrier in an unlicensed spectrum, a transmission resource provided by a wireless local area network WLAN, or a transmission resource provided by a secondary eNodeB; and a data transmission module, configured to transmit the service data by using the allocated transmission resource.

With reference to the first possible implementation manner of the third aspect, the transmission allocation module includes a first allocation unit, a second allocation unit, a third allocation unit, and a fourth allocation unit, where the first allocation unit is configured to: when the QoS information includes an aggregate maximum bit rate AMBR, an allocation/retention priority ARP, and a QoS class identifier QCI, if a rate indicated by the AMBR is greater than a first threshold, a priority indicated by the ARP is less than a first priority, and a delay indicated by the QCI is greater than a second threshold, preferably allocate the transmission resource that belongs to the first resource to the service data;

the second allocation unit is configured to: when the QoS information includes a guaranteed bit rate GBR, allocate the transmission resource that belongs to the non-first resource to the service data;

the third allocation unit is configured to: when the QoS information does not include the GBR, and the first resource is available, allocate the transmission resource that belongs to the first resource to the service data; or the fourth allocation unit is configured to: when the QoS information does not include the GBR but includes the ARP and the QCI, if a priority indicated by the ARP is less than a second priority and a delay indicated by the QCI is less than a third threshold, preferably allocate the transmission resource that belongs to the non-first resource to the service data.

With reference to the first possible implementation manner of the third aspect, in a second possible implementation manner, the data transmission module includes a first transmission unit, a second transmission unit, a third transmission unit, and a fourth transmission unit, where the first transmission unit is configured to: when the transmission resource allocated to the service data includes the transmission resource that belongs to the non-first resource, send, by using an LTE carrier in a licensed spectrum, data corresponding to the transmission resource that belongs to the non-first resource in the service data to a terminal;

the second transmission unit is configured to: when the transmission resource allocated to the service data includes the transmission resource that belongs to the first resource, and the first resource is the LTE carrier in the unlicensed spectrum, send, by using the LTE carrier in the unlicensed spectrum, data corresponding to the transmission resource that belongs to the first resource in the service data to a terminal;

the third transmission unit is configured to: when the transmission resource allocated to the service data includes the transmission resource that belongs to the first resource, and the first resource is the transmission resource provided by the WLAN, send data corresponding to the transmission resource that belongs to the first resource in the service data to a wireless access point of the WLAN, so that the wireless access point forwards the data to a terminal; or the fourth transmission unit is configured to: when the transmission resource allocated to the service data includes the transmission resource that belongs to the first resource, and the first resource is the transmission resource provided by the secondary eNodeB, instruct the secondary eNodeB to establish a bearer between the secondary eNodeB and a terminal, and send data corresponding to the transmission resource that belongs to the first resource in the service data to the secondary eNodeB, so that the secondary eNodeB forwards the data to the terminal by using the established bearer.

With reference to the third aspect, or the first or the second possible implementation manner, in a third possible implementation manner, the information receiving module is configured to receive the QoS information sent by a core network device; or the information receiving module is configured to receive the QoS information forwarded by a core network device by using a primary eNodeB.

With reference to the third aspect, or the first or the second possible implementation manner, in a fourth possible implementation manner, the device further includes a traffic statistics collection module and a traffic reporting module, where the traffic statistics collection module is configured to collect traffic statistics information respectively corresponding to the transmission resource that is used for transmitting the service data and belongs to the first resource and/or the transmission resource that is used for transmitting the service data and belongs to the non-first resource; and the traffic reporting module is configured to report the traffic statistics information to a core network device.

According to a fourth aspect, a data offloading method is provided, where the method includes:

receiving an offloading inclination indication of service data, where the offloading inclination indication is used to indicate a scheduling inclination of the service data on a first resource, and the first resource includes a Long Term Evolution LTE carrier in an unlicensed spectrum, a transmission resource provided by a wireless local area network WLAN, or a transmission resource provided by a secondary eNodeB;

allocating, according to the offloading inclination indication, a transmission resource used for transmitting the service data; and transmitting the service data by using the allocated transmission resource.

In a first possible implementation manner of the fourth aspect, the offloading inclination indication includes:
prohibiting scheduling on the first resource; or
allowing scheduling on the first resource; or
preferably performing scheduling on the first resource; or
preferably performing scheduling on a non-first resource.

With reference to the first possible implementation manner of the fourth aspect, in a second possible implementation manner, the allocating, according to the offloading inclination indication, a transmission resource used for transmitting the service data includes:
when the offloading inclination indication is used to instruct to prohibit scheduling on the first resource, allocating a transmission resource that belongs to the non-first resource to the service data; or
when the offloading inclination indication is used to instruct to allow scheduling on the first resource, and when the first resource is available, allocating a transmission resource that belongs to the first resource to the service data; or
when the offloading inclination indication is used to instruct to preferably perform scheduling on the first resource, preferably allocating a transmission resource that belongs to the first resource to the service data; or
when the offloading inclination indication is used to instruct to preferably perform scheduling on the non-first resource, preferably allocating a transmission resource that belongs to the non-first resource to the service data.

With reference to the second possible implementation manner of the fourth aspect, in a third possible implementation manner, the transmitting the service data by using the allocated transmission resource includes:
when the transmission resource allocated to the service data includes the transmission resource that belongs to the non-first resource, sending, by using an LTE carrier in a licensed spectrum, data corresponding to the transmission resource that belongs to the non-first resource in the service data to a terminal;
when the transmission resource allocated to the service data includes the transmission resource that belongs to the first resource, and the first resource is the LTE carrier in the unlicensed spectrum, sending, by using the LTE carrier in the unlicensed spectrum, data corresponding to the transmission resource that belongs to the first resource in the service data to a terminal;
when the transmission resource allocated to the service data includes the transmission resource that belongs to the first resource, and the first resource is the transmission resource provided by the WLAN, sending data corresponding to the transmission resource that belongs to the first resource in the service data to a wireless access point of the WLAN, so that the wireless access point forwards the data to a terminal; or
when the transmission resource allocated to the service data includes the transmission resource that belongs to the first resource, and the first resource is the transmission resource provided by the secondary eNodeB, instructing the secondary eNodeB to establish a bearer between the secondary eNodeB and a terminal, and sending data corresponding to the transmission resource that belongs to the first resource in the service data to the secondary eNodeB, so that the secondary eNodeB forwards the data to the terminal by using the established bearer.

With reference to the fourth aspect, or the first or the second or the third possible implementation manner, in a fourth possible implementation manner, the receiving an offloading inclination indication of service data includes:
receiving the offloading inclination indication sent by a core network device; or
receiving the offloading inclination indication forwarded by a core network device by using a primary eNodeB.

With reference to the fourth aspect, or the first or the second or the third possible implementation manner, in a fifth possible implementation manner, if the service data further includes uplink service data, after the receiving an offloading inclination indication of service data, the method further includes:
sending the offloading inclination indication to a terminal, so that the terminal determines, according to the offloading inclination indication, a transmission resource used for transmitting the uplink service data; or
sending an uplink offloading inclination indication in the offloading inclination indication to a terminal, so that the terminal determines, according to the uplink offloading inclination indication, a transmission resource used for transmitting the uplink service data.

With reference to the fourth aspect, or the first or the second or the third possible implementation manner, in a sixth possible implementation manner, after the transmitting the service data by using the allocated transmission resource, the method further includes:
collecting traffic statistics information respectively corresponding to the transmission resource that is used for transmitting the service data and belongs to the first resource and/or the transmission resource that is used for transmitting the service data and belongs to the non-first resource; and
reporting the traffic statistics information to a core network device.

With reference to the fourth aspect, or the first or the second or the third possible implementation manner, in a seventh possible implementation manner, the offloading inclination indication is carried by using a specific QoS class identifier QCI value.

According to a fifth aspect, a data offloading method is provided, where the method includes:
determining an offloading inclination indication of service data, where the offloading inclination indication is used to indicate a scheduling inclination of the service data on a first resource, and the first resource includes a Long Term Evolution LTE carrier in an unlicensed spectrum, a transmission resource provided by a wireless local area network WLAN, or a transmission resource provided by a secondary eNodeB; and
sending the offloading inclination indication of the service data to an access network device, so that the access network device allocates, according to the offloading inclination indication, a transmission resource used for transmitting the service data, and transmits the service data by using the allocated transmission resource.

In a first possible implementation manner of the fifth aspect, the determining an offloading inclination indication of service data includes:
acquiring QoS information of the service data; and
generating the offloading inclination indication of the service data according to the QoS information.

With reference to the first possible implementation manner of the fifth aspect, in a second possible implementation manner, the generating the offloading inclination indication of the service data according to the QoS information includes:
when the QoS information includes an aggregate maximum bit rate AMBR, an allocation/retention priority ARP, and a QoS class identifier QCI, if a rate indicated by the AMBR is greater than a first threshold, a priority indicated by the ARP is less than a first priority, and a delay indicated by the QCI is greater than a second threshold, generating an offloading inclination indication used to instruct to preferably perform scheduling on the first resource; or when the QoS information includes a guaranteed bit rate GBR, generating an offloading inclination indication used to instruct to prohibit scheduling on the first resource; or when the QoS information does not include the GBR, generating an offloading inclination indication used to instruct to allow scheduling on the first resource; or when the QoS information does not include the GBR but includes the ARP and the QCI, if a priority indicated by the ARP is less than a second priority and a delay indicated by the QCI is less than a third threshold, generating an offloading inclination indication used to instruct to preferably perform scheduling on a non-first resource.

With reference to the fifth aspect, or the first or the second possible implementation manner, in a third possible implementation manner, the sending the offloading inclination indication of the service data to an access network device includes:

sending the offloading inclination indication to a primary eNodeB; or forwarding the offloading inclination indication to the secondary eNodeB by using a primary eNodeB.

With reference to the fifth aspect, or the first or the second possible implementation manner, in a fourth possible implementation manner, after the sending the offloading inclination indication of the service data to an access network device, the method further includes:

receiving traffic statistics information fed back by the access network device, where the traffic statistics information is fed back by the access network device after collecting traffic respectively corresponding to the transmission resource that is used for transmitting the service data and belongs to the first resource and/or the transmission resource that is used for transmitting the service data and belongs to the non-first resource.

With reference to the fourth possible implementation manner of the fifth aspect, in a fifth possible implementation manner, when the core network device is a mobility management entity MME, after the receiving traffic statistics information fed back by the access network device, the method further includes:

sending the traffic statistics information to a charging network element, so that the charging network element performs, according to the traffic statistics information, differential charging on the transmission resource that belongs to the first resource and/or the transmission resource that belongs to the non-first resource.

With reference to the fifth aspect, or the first or the second possible implementation manner, in a sixth possible implementation manner, the offloading inclination indication is carried by using a specific QoS class identifier QCI value.

According to a sixth aspect, a data offloading method is provided, where the method includes:

receiving QoS information of service data;

allocating, according to the QoS information, a transmission resource used for transmitting the service data, where the transmission resource includes a transmission resource that belongs to a first resource and a transmission resource that belongs to a non-first resource, and the first resource includes a Long Term Evolution LTE carrier in an unlicensed spectrum, a transmission resource provided by a wireless local area network WLAN, or a transmission resource provided by a secondary eNodeB; and transmitting the service data by using the allocated transmission resource.

In a first possible implementation manner of the sixth aspect, the allocating, according to the QoS information, a transmission resource used for transmitting the service data includes:

when the QoS information includes an aggregate maximum bit rate AMBR, an allocation/retention priority ARP, and a QoS class identifier QCI, if a rate indicated by the AMBR is greater than a first threshold, a priority indicated by the ARP is less than a first priority, and a delay indicated by the QCI is greater than a second threshold, preferably allocating the transmission resource that belongs to the first resource to the service data; or when the QoS information includes a guaranteed bit rate GBR, allocating the transmission resource that belongs to the non-first resource to the service data; or when the QoS information does not include the GBR but includes the ARP and the QCI, if a priority indicated by the ARP is less than a second priority and a delay indicated by the QCI is less than a third threshold, preferably allocating the transmission resource that belongs to the non-first resource to the service data.

With reference to the first possible implementation manner of the sixth aspect, in a second possible implementation manner, the transmitting the service data by using the allocated transmission resource includes:

when the transmission resource allocated to the service data includes the transmission resource that belongs to the non-first resource, sending, by using an LTE carrier in a licensed spectrum, data corresponding to the transmission resource that belongs to the non-first resource in the service data to a terminal;

when the transmission resource allocated to the service data includes the transmission resource that belongs to the first resource, and the first resource is the LTE carrier in the unlicensed spectrum, sending, by using the LTE carrier in the unlicensed spectrum, data corresponding to the transmission resource that belongs to the first resource in the service data to a terminal;

when the transmission resource allocated to the service data includes the transmission resource that belongs to the first resource, and the first resource is the transmission resource provided by the WLAN, sending data corresponding to the transmission resource that belongs to the first resource in the service data to a wireless access point of the WLAN, so that the wireless access point forwards the data to a terminal; or when the transmission resource allocated to the service data includes the transmission resource that belongs to the first resource, and the first resource is the transmission resource provided by the secondary eNodeB, instructing the secondary eNodeB to establish a bearer between the secondary eNodeB and a terminal, and sending data corresponding to the transmission resource that belongs to the first resource in the service data to the secondary eNodeB, so that the secondary eNodeB forwards the data to the terminal by using the established bearer.

With reference to the sixth aspect, or the first or the second possible implementation manner, in a third possible implementation manner, the receiving QoS information of service data from a core network device includes:

receiving the QoS information directly sent by the core network device; or receiving the QoS information forwarded by the core network device by using a primary eNodeB.

With reference to the sixth aspect, or the first or the second possible implementation manner, in a fourth possible implementation manner, after the transmitting the offloaded service data by using the allocated transmission resource, the method further includes:

collecting traffic statistics information respectively corresponding to the transmission resource that is used for transmitting the service data and belongs to the first resource and/or the transmission resource that is used for transmitting the service data and belongs to the non-first resource; and reporting the traffic statistics information to a core network device.

According to a seventh aspect, a data offloading system is provided, where the system includes a core network device and an access network device, where the core network device is the device according to the first aspect and the possible implementation manners of the first aspect; and the access network device is the device according to the second aspect and the possible implementation manners of the second aspect.

According to an eighth aspect, a data offloading system is provided, where the system includes a core network device and an access network device, where the access network device is the device according to the third aspect and the possible implementation manners of the third aspect.

Beneficial effects of the technical solutions provided in the embodiments of the present invention are as follows:

An access network device receives an offloading inclination indication of service data from a core network device; the access network device allocates, according to the offloading inclination indication, a transmission resource used for transmitting the service data; and the access network device transmits the service data by using the allocated transmission resource, which resolves a problem that QoS in a transmission process cannot be ensured when data is offloaded by using a first resource such as an unlicensed spectrum, a transmission resource provided by a WLAN, or a transmission resource provided by a secondary eNodeB, and achieves an effect that the QoS in the transmission process can be ensured even if the data is offloaded by using the first resource such as the unlicensed spectrum, the transmission resource provided by the WLAN, or the transmission resource provided by the secondary eNodeB.

BRIEF DESCRIPTION OF DRAWINGS

To describe the technical solutions in the embodiments of the present invention more clearly, the following briefly describes the accompanying drawings required for describing the embodiments. Apparently, the accompanying drawings in the following description show merely some embodiments of the present invention, and a person of ordinary skill in the art may still derive other drawings from these accompanying drawings without creative efforts.

DESCRIPTION OF EMBODIMENTS

To make the objectives, technical solutions, and advantages of the present invention clearer, the following further describes the implementation manners of the present invention in detail with reference to the accompanying drawings.

An implementation environment of an embodiment of the present invention mainly relates to a core network device, an access network device, and a terminal.

An LTE (Long Term Evolution) communications system is used as an example. The core network device may be an MME (Mobile Management Entity); the access network device may be a P-eNB (Primary-eNodeB), or may be an S-eNB (Secondary-eNodeB); the terminal may be UE (User equipment). In another communications system, specific names and functions of the core network device, the access network device, and the terminal may be slightly different.

Figure 1A:
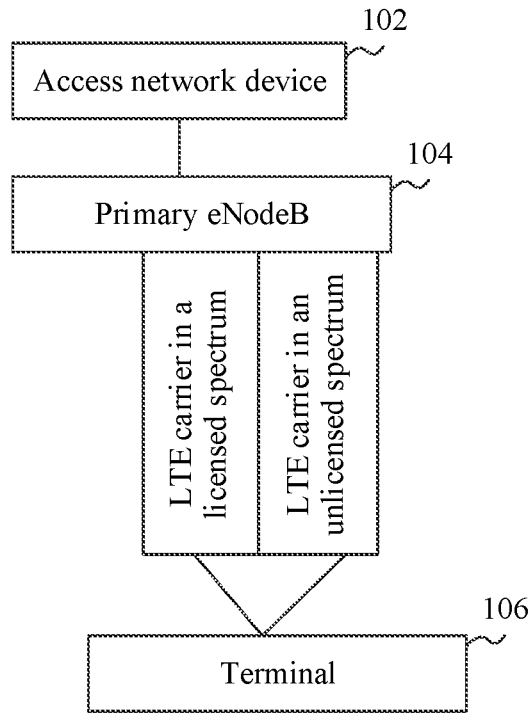
FIG. 1A to FIG. 1C are schematic structural diagrams of three implementation environments presented when an access network device related to an embodiment of the present invention is a primary eNodeB.
Figure 1B:
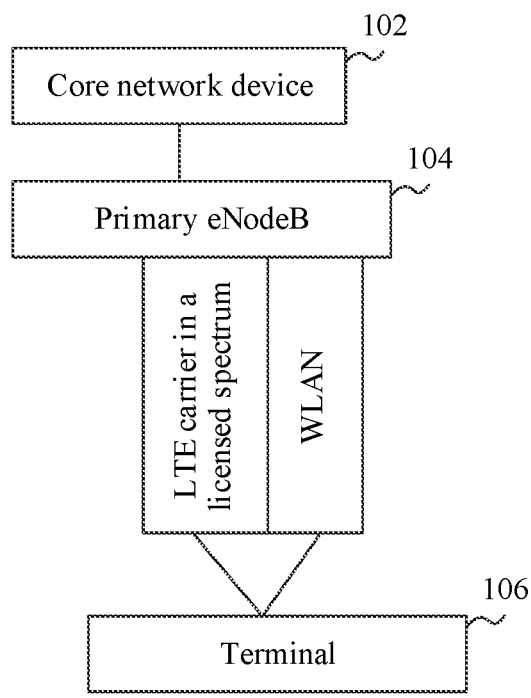
Figure 1C:
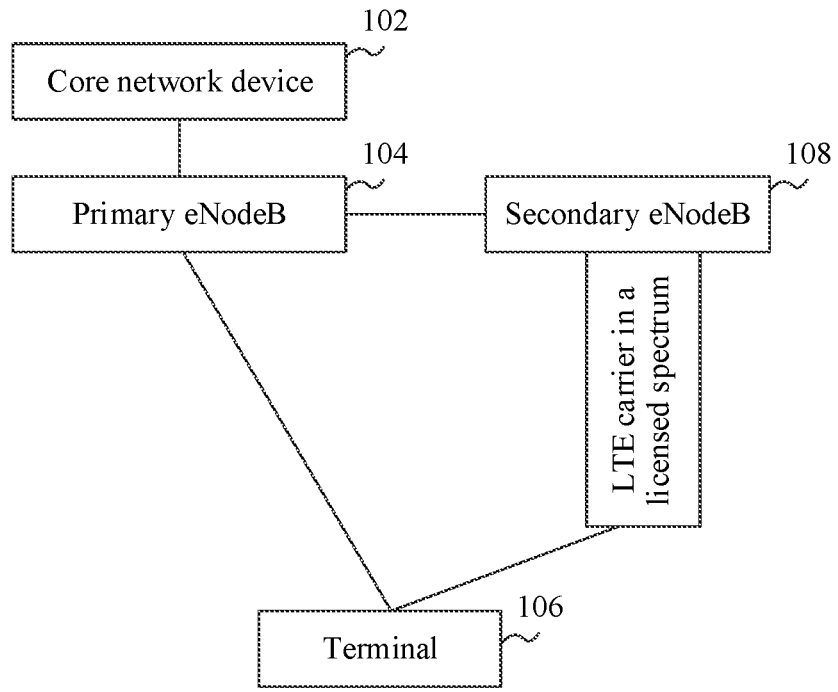

Referring to FIG. 1A to FIG. 1C, FIG. 1A to FIG. 1C show schematic structural diagrams of three implementation environments presented when an access network device related to an embodiment of the present invention is a primary eNodeB. Specifically:

FIG. 1A shows a schematic diagram of an architecture obtained when a primary eNodeB offloads data by using an LTE carrier in an unlicensed spectrum, and the architecture includes a core network device 102, a primary eNodeB 104, and a terminal 106. The core network device 102 is connected to the primary eNodeB 104 by using a wired network, and the primary eNodeB 104 is connected to the terminal 106 by using a wireless network. The core network device 102 is configured to deliver a control instruction to the primary eNodeB 104, and the primary eNodeB 104 and the terminal 106 perform offloading transmission on service data by using an LTE carrier in a licensed spectrum and the LTE carrier in the unlicensed spectrum.

FIG. 1B shows a schematic diagram of an architecture obtained when a primary eNodeB offloads data by using a transmission resource provided by a WLAN, and the architecture includes a core network device 102, a primary eNodeB 104, and a terminal 106. The core network device 102 is connected to the primary eNodeB 104 by using a wired network, and the primary eNodeB 104 is connected to the terminal 106 by using a wireless network. The core network device 102 is configured to deliver a control instruction to the primary eNodeB 104, and the primary eNodeB 104 and the terminal 106 perform offloading transmission on service data by using an LTE carrier in a licensed spectrum and the transmission resource provided by the WLAN.

FIG. 1C shows a schematic diagram of an architecture obtained when a primary eNodeB offloads data by using a transmission resource provided by a secondary eNodeB, and the architecture includes a core network device 102, a primary eNodeB 104, a terminal 106, and a secondary eNodeB 108. The core network device 102 is connected to the primary eNodeB 104 by using a wired network, the primary eNodeB 104 is connected to the secondary eNodeB 108 by using a wired or wireless network, and the primary eNodeB 104 and the secondary eNodeB 108 are connected to the terminal 106 by using a wireless network. The core network device 102 is configured to deliver a control instruction to the primary eNodeB 104, and the primary eNodeB 104 and the terminal 106 perform offloading transmission on service data by using an LTE carrier in a licensed spectrum and the transmission resource provided by the secondary eNodeB 108.

Figure 2A:
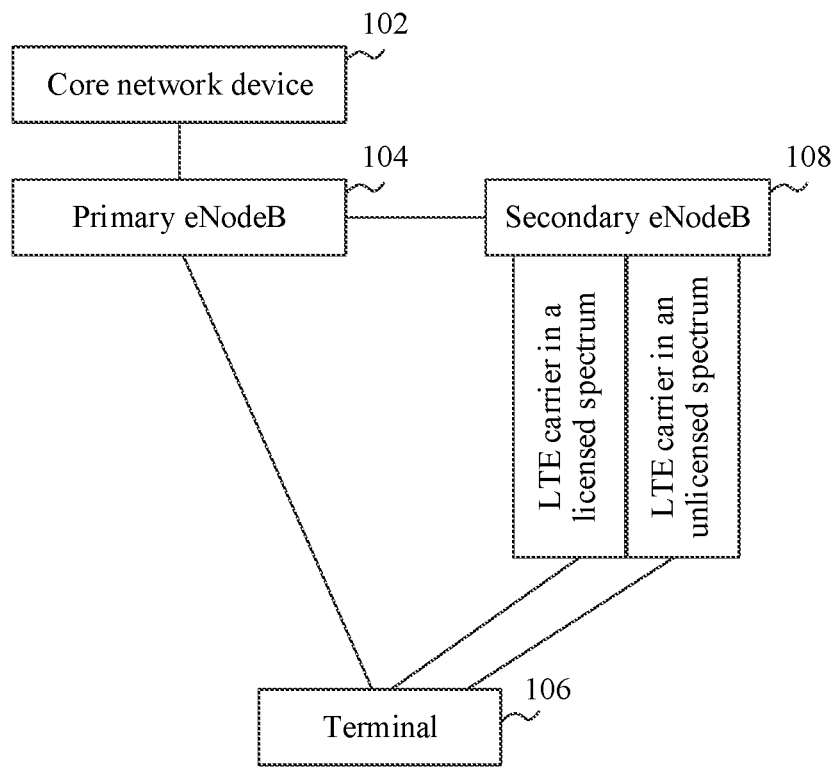
FIG. 2A and FIG. 2B are schematic structural diagrams of two implementation environments presented when an access network device related to an embodiment of the present invention is a secondary eNodeB.
Figure 2B:
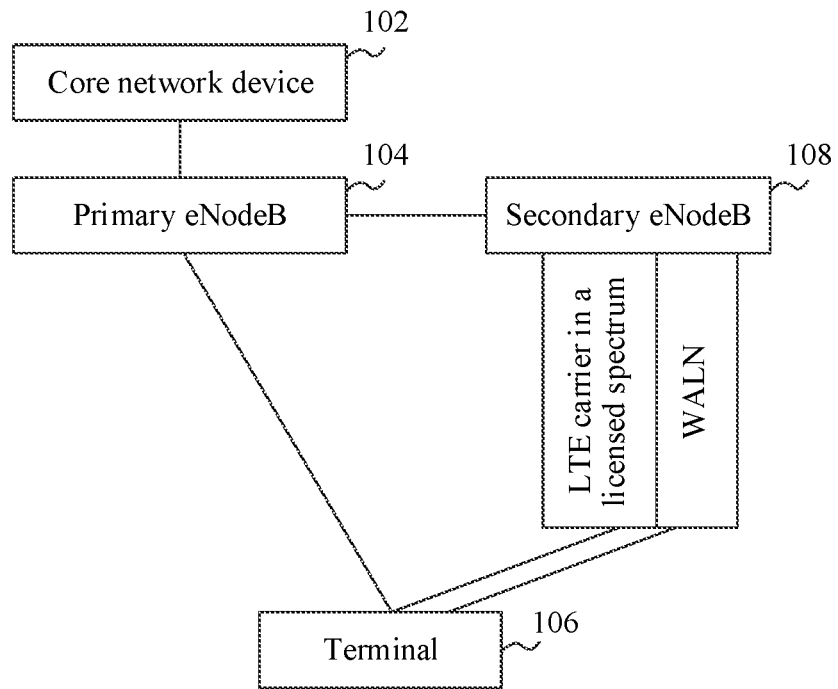

Referring to FIG. 2A and FIG. 2B, FIG. 2A and FIG. 2B show schematic structural diagrams of two implementation environments presented when an access network device related to an embodiment of the present invention is a secondary eNodeB.

FIG. 2A shows a schematic diagram of an architecture obtained when a secondary eNodeB offloads data by using an LTE carrier in an unlicensed spectrum, and the architecture includes a core network device 102, a primary eNodeB 104, a terminal 106, and a secondary eNodeB 108. The core network device 102 is connected to the primary eNodeB 104 by using a wired network, the primary eNodeB 104 is connected to the secondary eNodeB 108 by using a wired or wireless network, and the primary eNodeB 104 and the secondary eNodeB 108 are connected to the terminal 106 by using a wireless network. The core network device 102 is configured to deliver a control instruction to the secondary eNodeB 108 by using the primary eNodeB 104, and the secondary eNodeB 108 and the terminal 106 perform offloading transmission on service data by using an LTE carrier in a licensed spectrum and the LTE carrier in the unlicensed spectrum.

FIG. 2B shows a schematic diagram of an architecture obtained when a primary eNodeB offloads data by using a transmission resource provided by a WLAN, and the architecture includes a core network device 102, a primary eNodeB 104, a terminal 106, and a secondary eNodeB 108. The core network device 102 is connected to the primary eNodeB 104 by using a wired network, the primary eNodeB 104 is connected to the secondary eNodeB 108 by using a wired or wireless network, and the primary eNodeB 104 and the secondary eNodeB 108 are connected to the terminal 106 by using a wireless network. The core network device 102 is configured to deliver a control instruction to the secondary eNodeB 108 by using the primary eNodeB 104, and the secondary eNodeB 108 and the terminal 106 perform offloading transmission on service data by using an LTE carrier in a licensed spectrum and the transmission resource provided by the WLAN.

Figure 3:
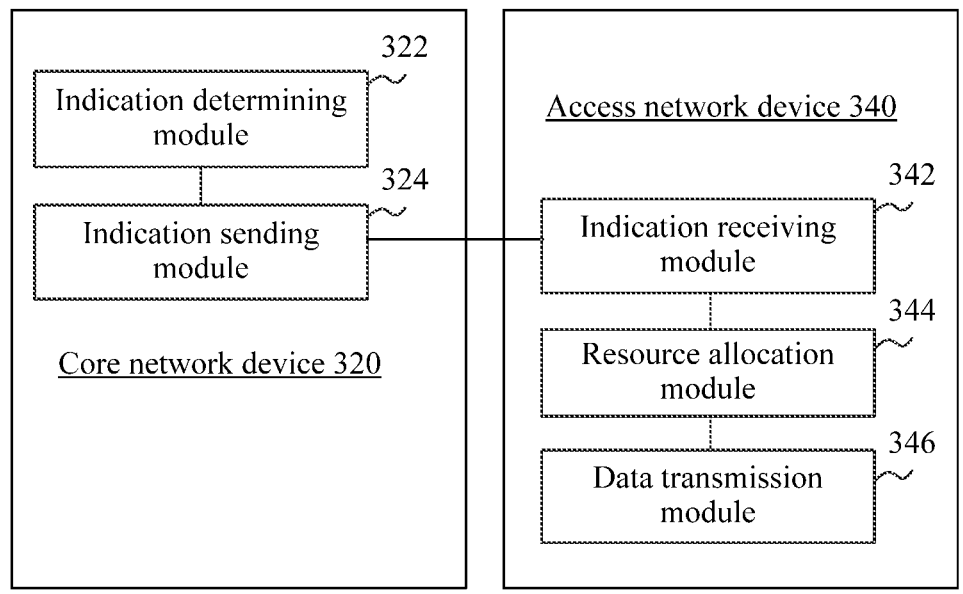
FIG. 3 is a schematic structural diagram of a data offloading system according to an embodiment of the present invention.

Referring to FIG. 3, FIG. 3 shows a schematic structural diagram of a data offloading system according to an embodiment of the present invention. This embodiment is described by using an example in which the access network device is the primary eNodeB 104 shown in FIG. 1A/FIG. 1B/FIG. 1C, or the access network device is the secondary eNodeB 108 shown in FIG. 2B/FIG. 2C. The system includes a core network device 320 and an access network device 340.

The core network device 320 includes an indication determining module 322 and an indication sending module 324.

The indication determining module 322 is configured to determine an offloading inclination indication of service data, where the offloading inclination indication is used to indicate a scheduling inclination of the service data on a first resource, and the first resource includes an LTE carrier in an unlicensed spectrum, a transmission resource provided by a WLAN, or a transmission resource provided by a secondary eNodeB. The service data mainly refers to downlink service data in this embodiment.

The indication sending module 324 is configured to send the offloading inclination indication of the service data to the access network device 340, so that the access network device 340 allocates, according to the offloading inclination indication, a transmission resource used for transmitting the service data, and transmits the service data by using the allocated transmission resource.

The access network device 340 includes an indication receiving module 342, a resource allocation module 344, and a data transmission module 346.

The indication receiving module 342 is configured to receive the offloading inclination indication of the service data, where the offloading inclination indication is used to indicate the scheduling inclination of the service data on the first resource, and the first resource includes the LTE carrier in the unlicensed spectrum, the transmission resource provided by the WLAN, or the transmission resource provided by the secondary eNodeB. The offloading inclination indication may be generated by the core network device according to QoS information of the service data.

The resource allocation module 344 is configured to allocate, according to the offloading inclination indication, the transmission resource used for transmitting the service data.

The data transmission module 346 is configured to transmit the service data by using the allocated transmission resource.

In conclusion, according to the data offloading system provided in this embodiment, an access network device receives an offloading inclination indication of service data from a core network device; allocates, according to the offloading inclination indication, a transmission resource used for transmitting the service data; and transmits the service data by using the allocated transmission resource, which resolves a problem that QoS in a transmission process cannot be ensured when data is offloaded by using a first resource such as an unlicensed spectrum, a transmission resource provided by a WLAN, or a transmission resource provided by a secondary eNodeB, and achieves an effect that the QoS in the transmission process can be ensured even if the data is offloaded by using the first resource such as the unlicensed spectrum, the transmission resource provided by the WLAN, or the transmission resource provided by the secondary eNodeB.

Figure 4:
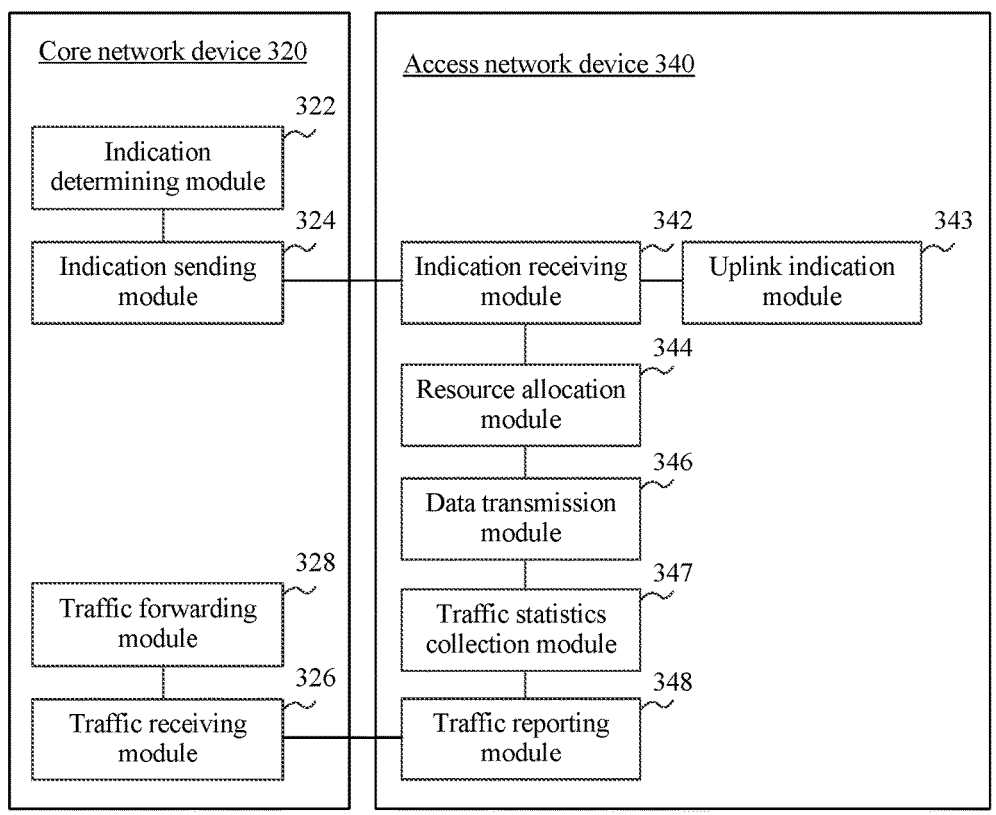
FIG. 4 is a schematic structural diagram of a data offloading system according to another embodiment of the present invention.

Referring to FIG. 4, FIG. 4 shows a schematic structural diagram of a data offloading system according to another embodiment of the present invention. This embodiment is described by using an example in which the access network device is the primary eNodeB 104 shown in FIG. 1A/FIG.

1B/FIG. 1C, or the access network device is the secondary eNodeB 108 shown in FIG. 2B/FIG. 2C. The system includes a core network device 320 and an access network device 340.

The core network device 320 includes an indication determining module 322, an indication sending module 324, a traffic receiving module 326, and a traffic forwarding module 328.

The indication determining module 322 is configured to determine an offloading inclination indication of service data, where the offloading inclination indication is used to indicate a scheduling inclination of the service data on a first resource, and the first resource includes an LTE carrier in an unlicensed spectrum, a transmission resource provided by a WLAN, or a transmission resource provided by a secondary eNodeB. The service data mainly refers to downlink service data in this embodiment, or the service data may include both downlink service data and uplink service data.

The indication determining module 322 includes an information acquiring unit and an indication generation unit.

The information acquiring unit is configured to acquire QoS information of the service data.

The indication generation unit is configured to generate the offloading inclination indication of the service data according to the QoS information. Preferably, the offloading inclination indication includes: prohibiting scheduling on the first resource; or allowing scheduling on the first resource; or preferably performing scheduling on the first resource; or preferably performing scheduling on a non-first resource. Preferably, the offloading inclination indication is carried by using a specific QoS class identifier QCI value.

That is, the indication generation unit includes a first generation subunit, a second generation subunit, a third generation subunit, and a fourth generation subunit.

The first generation subunit is configured to: when the QoS information includes an AMBR (Aggregate Maximum Bit Rate), an ARP (Allocation/Retention Priority), and a QCI (QoS Class Identifier), if a rate indicated by the AMBR is greater than a first threshold, a priority indicated by the ARP is less than a first priority, and a delay indicated by the QCI is greater than a second threshold, generate the offloading inclination indication used to instruct to preferably perform scheduling on the first resource.

The second generation subunit is configured to: when the QoS information includes a guaranteed bit rate GBR, generate the offloading inclination indication used to instruct to prohibit scheduling on the first resource.

The third generation subunit is configured to: when the QoS information does not include the GBR, generate the offloading inclination indication used to instruct to allow scheduling on the first resource.

The fourth generation subunit is configured to: when the QoS information does not include the GBR but includes the ARP and the QCI, if a priority indicated by the ARP is less than a second priority and a delay indicated by the QCI is less than a third threshold, generate the offloading inclination indication used to instruct to preferably perform scheduling on the non-first resource.

It should be noted that if the service data includes uplink service data, the foregoing offloading inclination indication may be an uplink-downlink shared offloading inclination indication, or may include a downlink offloading inclination indication dedicated to a downlink and/or an uplink offloading inclination indication dedicated to an uplink.

The indication sending module 324 is configured to send the offloading inclination indication that is of the service data and is determined by the indication determining module 322 to the access network device 340. When the access network device is a primary eNodeB, the indication sending module 324 is configured to directly send the offloading inclination indication to the eNodeB. When the access network device is a secondary eNodeB, the indication sending module is configured to forward the offloading inclination indication to the secondary eNodeB by using a primary eNodeB.

The traffic receiving module 326 is configured to receive traffic statistics information fed back by the access network device 340, wherein the traffic statistics information is fed back by the access network device 340 after the access network device 340 have collected traffic respectively corresponding to a transmission resource that is used for transmitting the service data and belongs to the first resource and/or a transmission resource that is used for transmitting the service data and belongs to the non-first resource.

When the core network device is a mobility management entity MME, the device further includes the traffic forwarding module 328.

The traffic forwarding module 328 is configured to send the traffic statistics information to a charging network element, so that the charging network element performs, according to the traffic statistics information, differential charging on the transmission resource that belongs to the first resource and/or the transmission resource that belongs to the non-first resource.

The access network device 340 includes an indication receiving module 342, an uplink indication module 343, a resource allocation module 344, a data transmission module 346, a traffic statistics collection module 347, and a traffic reporting module 348.

The indication receiving module 342 is configured to receive the offloading inclination indication of the service data, where the offloading inclination indication is used to indicate the scheduling inclination of the service data on the first resource, and the first resource includes the LTE carrier in the unlicensed spectrum, the transmission resource provided by the WLAN, or the transmission resource provided by the secondary eNodeB. The offloading inclination indication may be generated by the core network device according to the QoS information of the service data.

When the access network device 340 is a primary eNodeB, the indication receiving module 342 is configured to receive the offloading inclination indication sent by the core network device 320; or when the access network device 340 is a secondary eNodeB, the indication receiving module 342 is configured to receive the offloading inclination indication forwarded by the core network device 340 by using a primary eNodeB. In another possible implementation manner, the indication receiving module 342 is configured to receive the offloading inclination indication sent by a primary eNodeB, wherein the offloading inclination indication is generated by the primary eNodeB according to the QoS information of the service data after the primary eNodeB receives the QoS information that is of the service data and is sent by the core network device. For a process in which the primary eNodeB generates the offloading inclination indication according to the QoS information of the service data, refer to the related description of the indication determining module 322.

The resource allocation module 344 is configured to allocate, according to the offloading inclination indication received by the indication receiving module 342, a transmission resource used for transmitting the service data. Preferably, the offloading inclination indication includes: prohibiting scheduling on the first resource; or allowing scheduling on the first resource; or preferably performing scheduling on the first resource; or preferably performing scheduling on the non-first resource. In this case, the resource allocation module 344 is configured to: when the offloading inclination indication is used to instruct to prohibit scheduling on the first resource, allocate the transmission resource that belongs to the non-first resource to the service data; or the resource allocation module 344 is configured to: when the offloading inclination indication is used to instruct to preferably perform scheduling on the first resource, preferably allocate the transmission resource that belongs to the first resource to the service data; or the resource allocation module 344 is configured to: when the offloading inclination indication is used to instruct to allow scheduling on the first resource, and the first resource is available, allocate the transmission resource that belongs to the first resource to the service data; or the resource allocation module 344 is configured to: when the offloading inclination indication is used to instruct to preferably perform scheduling on the non-first resource, preferably allocate the transmission resource that belongs to the non-first resource to the service data.

The data transmission module 346 is configured to transmit the service data by using the transmission resource allocated by the resource allocation module 344. Correspondingly, the data transmission module 346 includes a first transmission unit, a second transmission unit, a third transmission unit, and a fourth transmission unit.

The first transmission unit is configured to: when the transmission resource allocated by the resource allocation module 344 to the service data includes the transmission resource that belongs to the non-first resource, send, by using an LTE carrier in a licensed spectrum, data corresponding to the transmission resource that belongs to the non-first resource in the service data to a terminal.

The second transmission unit is configured to: when the transmission resource allocated by the resource allocation module 344 to the service data includes the transmission resource that belongs to the first resource, and the first resource is the LTE carrier in the unlicensed spectrum, send, by using the LTE carrier in the unlicensed spectrum, data corresponding to the transmission resource that belongs to the first resource in the service data to a terminal.

The third transmission unit is configured to: when the transmission resource allocated by the resource allocation module 344 to the service data includes the transmission resource that belongs to the first resource, and the first resource is the transmission resource provided by the WLAN, send data corresponding to the transmission resource that belongs to the first resource in the service data to a wireless access point of the WLAN, so that the wireless access point forwards the data to a terminal.

The fourth transmission unit is configured to: when the transmission resource allocated by the resource allocation module 344 to the service data includes the transmission resource that belongs to the first resource, and the first resource is the transmission resource provided by the secondary eNodeB, instruct the secondary eNodeB to establish a bearer between the secondary eNodeB and a terminal, and send data corresponding to the transmission resource that belongs to the first resource in the service data to the secondary eNodeB, so that the secondary eNodeB forwards the data to the terminal by using the established bearer.

It should be noted that if the service data further includes uplink service data, the device further includes the uplink indication module 343.

The uplink indication module 343 is configured to, when the offloading inclination indication received by the indication receiving module 342 is an uplink-downlink shared offloading inclination indication, send the offloading inclination indication to the terminal, so that the terminal determines, according to the offloading inclination indication, a transmission resource used for transmitting the uplink service data, and transmits the uplink service data according to the determined transmission resource used for transmitting the uplink service data.

The uplink indication module 343 is configured to, when the offloading inclination indication received by the indication receiving module 342 includes a separate uplink offloading inclination indication, send the uplink offloading inclination indication in the offloading inclination indication to the terminal, so that the terminal determines, according to the uplink offloading inclination indication, a transmission resource used for transmitting the uplink service data, and transmits the uplink service data according to the determined transmission resource used for transmitting the uplink service data.

Certainly, in a scenario in which the service data includes only the uplink service data, the access network device 340 may not include the resource allocation module 344 and the data transmission module 346, and include only the indication receiving module 342 and the uplink indication module 343.

The device further includes the traffic statistics collection module 347 and the traffic reporting module 348.

The traffic statistics collection module 347 is configured to collect the traffic statistics information respectively corresponding to the transmission resource that is used for transmitting the service data and belongs to the first resource and/or the transmission resource that is used for transmitting the service data and belongs to the non-first resource.

The traffic reporting module 348 is configured to report the traffic statistics information to the core network device 320. Differential charging may be performed on the first resource and the non-first resource after the traffic statistics information is received by the core network device 320.

In conclusion, according to the data offloading system provided in this embodiment, an access network device receives an offloading inclination indication of service data from a core network device; allocates, according to the offloading inclination indication, a transmission resource used for transmitting the service data; and transmits the service data by using the allocated transmission resource, which resolves a problem that QoS in a transmission process cannot be ensured when data is offloaded by using a first resource such as an unlicensed spectrum, a transmission resource provided by a WLAN, or a transmission resource provided by a secondary eNodeB, and achieves an effect that the QoS in the transmission process can be ensured even if the data is offloaded by using the first resource such as the unlicensed spectrum, the transmission resource provided by the WLAN, or the transmission resource provided by the secondary eNodeB.

According to the data offloading system provided in this embodiment, the core network device further generates the offloading inclination indication according to QoS information, which can effectively ensure the QoS of the service data. The offloading inclination indication is further sent to a terminal, so that the QoS is ensured when the service data includes uplink service data. The offloading inclination indication is further carried by using a specific QoS class identifier QCI value, which reduces signal interaction between the core network device and the access network device, and reduces a demand for control resources. The access network device further reports traffic statistics information to the core network device, which helps implement an effect of differential charging or other statistics collection on the first resource and a non-first resource.

Figure 5:
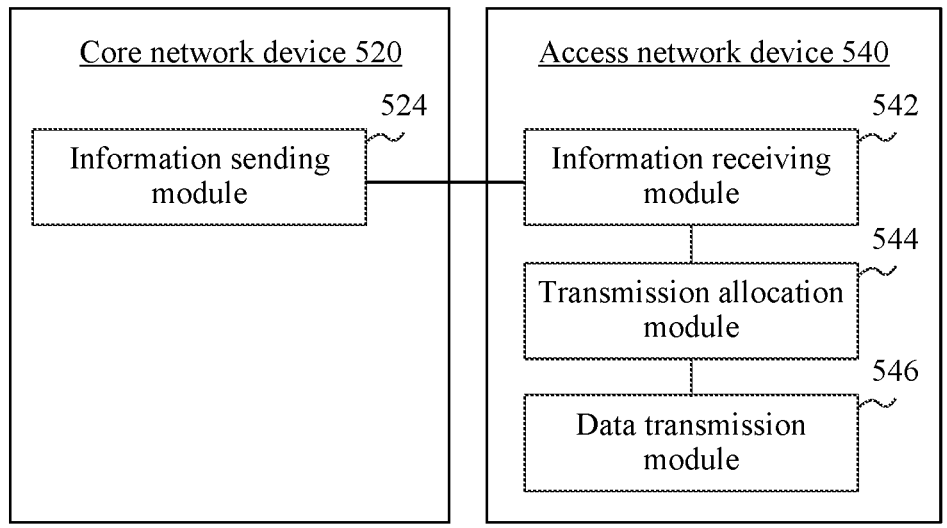
FIG. 5 is a schematic structural diagram of a data offloading system according to an embodiment of the present invention.

Referring to FIG. 5, FIG. 5 shows a schematic structural diagram of a data offloading system according to an embodiment of the present invention. This embodiment is described by using an example in which the access network device is the primary eNodeB 104 shown in FIG. 1A/FIG. 1B/FIG. 1C, or the access network device is the secondary eNodeB 108 shown in FIG. 2B/FIG. 2C. The system includes a core network device 520 and an access network device 540.

The core network device 520 includes an information sending module 522.

The information sending module 522 is configured to send QoS information of service data to the access network device 540.

The access network device 540 includes an information receiving module 542, a transmission allocation module 544, and a data transmission module 546.

The information receiving module 542 is configured to receive the QoS information of the service data.

The transmission allocation module 544 is configured to allocate, according to the QoS information, a transmission resource used for transmitting the service data, where the transmission resource includes a transmission resource that belongs to a first resource and a transmission resource that belongs to a non-first resource, and the first resource includes an LTE carrier in an unlicensed spectrum, a transmission resource provided by a WLAN, or a transmission resource provided by a secondary eNodeB.

The data transmission module 546 is configured to transmit the service data by using the allocated transmission resource.

In conclusion, according to the data offloading system provided in this embodiment, an access network device receives QoS information from a core network device; allocates, according to the QoS information, a transmission resource used for transmitting service data; and transmits the service data by using the allocated transmission resource, which resolves a problem that QoS in a transmission process cannot be ensured when data is offloaded by using a first resource such as an unlicensed spectrum, a transmission resource provided by a WLAN, or a transmission resource provided by a secondary eNodeB, and achieves an effect that the QoS in the transmission process can be ensured even if the data is offloaded by using the first resource such as the unlicensed spectrum, the transmission resource provided by the WLAN, or the transmission resource provided by the secondary eNodeB.

Figure 6:
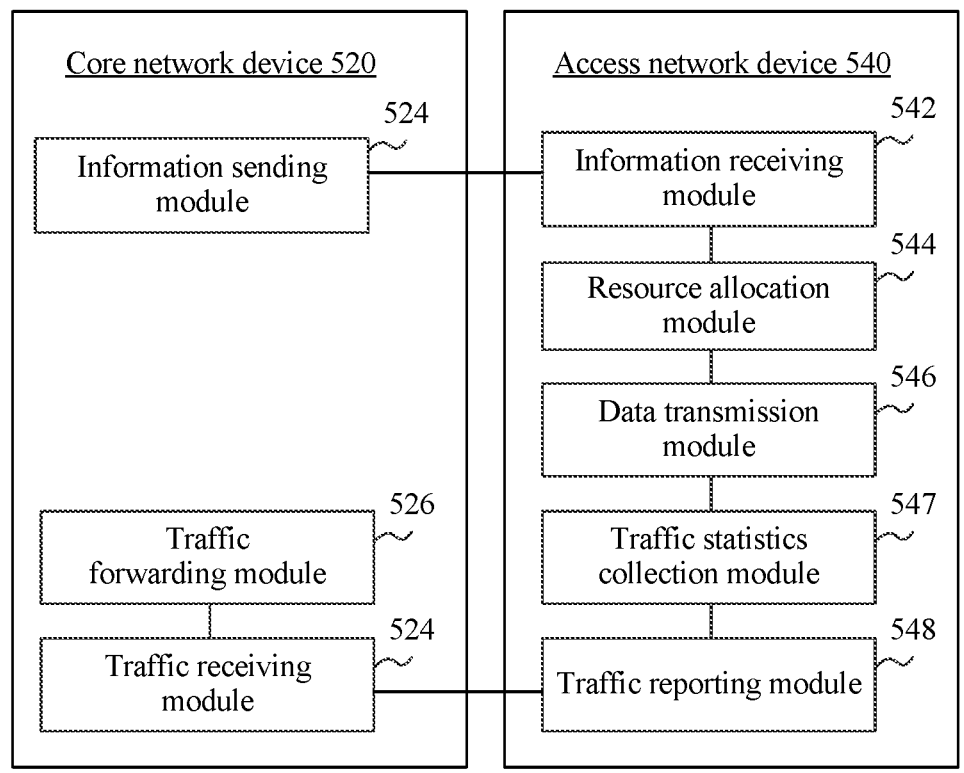
FIG. 6 is a schematic structural diagram of a data offloading system according to another embodiment of the present invention.

Referring to FIG. 6, FIG. 6 shows a schematic structural diagram of a data offloading system according to another embodiment of the present invention. This embodiment is described by using an example in which the access network device is the primary eNodeB 104 shown in FIG. 1A/FIG. 1B/FIG. 1C, or the access network device is the secondary eNodeB 108 shown in FIG. 2B/FIG. 2C. The system includes a core network device 520 and an access network device 540.

The core network device 520 includes an information sending module 522, a traffic receiving module 524, and a traffic forwarding module 526.

The information sending module 522 is configured to send QoS information of service data to the access network device 540. The information sending module 522 is configured to directly send the QoS information to a primary eNodeB; or the information sending module 522 is configured to forward the QoS information to a secondary eNodeB by using a primary eNodeB.

The traffic receiving module 524 is configured to receive traffic statistics information fed back by the access network device 540, wherein the traffic statistics information is fed back by the access network device 540 after collecting traffic respectively corresponding to a transmission resource that is used for transmitting the service data and belongs to a first resource and/or a transmission resource that is used for transmitting the service data and belongs to a non-first resource.

When the core network device is a mobility management entity MME, the core network device further includes the traffic forwarding module 526.

The traffic forwarding module 526 is configured to send the traffic statistics information to a charging network element, so that the charging network element performs, according to the traffic statistics information, differential charging on a transmission resource that belongs to the first resource and/or a transmission resource that belongs to the non-first resource.

The access network device 540 includes an information receiving module 542, a transmission allocation module 544, a data transmission module 546, a traffic statistics collection module 547, and a traffic reporting module 548.

The information receiving module 542 is configured to receive the QoS information of the service data. The QoS information includes but is not limited to a QCI (QoS Class Identifier), a GBR (Guaranteed Bit Rate), an AMBR (Aggregate Maximum Bit Rate), and an ARP (allocation/retention priority). The information receiving module 542 is configured to receive the QoS information directly sent by the core network device 520; or the information receiving module 542 is configured to receive the QoS information forwarded by the core network device 520 by using the primary eNodeB.

The transmission allocation module 544 is configured to allocate, according to the QoS information, a transmission resource used for transmitting the service data, wherein the transmission resource includes the transmission resource that belongs to the first resource and the transmission resource that belongs to the non-first resource, and the first resource includes an LTE carrier in an unlicensed spectrum, a transmission resource provided by a WLAN, or a transmission resource provided by a secondary eNodeB.

The transmission allocation module 544 includes a first allocation unit, a second allocation unit, a third allocation unit, and a fourth allocation unit.

The first allocation unit is configured to: when the QoS information includes the aggregate maximum bit rate AMBR, the allocation/retention priority ARP, and the QoS class identifier QCI, if a rate indicated by the AMBR is greater than a first threshold, a priority indicated by the ARP is less than a first priority, and a delay indicated by the QCI is greater than a second threshold, preferably allocate the transmission resource that belongs to the first resource to the service data.

The second allocation unit is configured to: when the QoS information includes the guaranteed bit rate GBR, allocate the transmission resource that belongs to the non-first resource to the service data.

The third allocation unit is configured to: when the QoS information does not include the GBR, and the first resource is available, allocate the transmission resource that belongs to the first resource to the service data.

The fourth allocation unit is configured to: when the QoS information does not include the GBR but includes the ARP and the QCI, if a priority indicated by the ARP is less than a second priority and a delay indicated by the QCI is less than a third threshold, preferably allocate the transmission resource that belongs to the non-first resource to the service data.

The data transmission module 546 is configured to transmit the service data by using the allocated transmission resource.

The data transmission module 546 includes a first transmission unit, a second transmission unit, a third transmission unit, and a fourth transmission unit.

The first transmission unit is configured to: when the transmission resource allocated to the service data includes the transmission resource that belongs to the non-first resource, send, by using an LTE carrier in a licensed spectrum, data corresponding to the transmission resource that belongs to the non-first resource in the service data to a terminal.

The second transmission unit is configured to: when the transmission resource allocated to the service data includes the transmission resource that belongs to the first resource, and the first resource is the LTE carrier in the unlicensed spectrum, send, by using the LTE carrier in the unlicensed spectrum, data corresponding to the transmission resource that belongs to the first resource in the service data to a terminal.

The third transmission unit is configured to: when the transmission resource allocated to the service data includes the transmission resource that belongs to the first resource, and the first resource is the transmission resource provided by the WLAN, send data corresponding to the transmission resource that belongs to the first resource in the service data to a wireless access point of the WLAN, so that the wireless access point forwards the data to a terminal.

The fourth transmission unit is configured to: when the transmission resource allocated to the service data includes the transmission resource that belongs to the first resource, and the first resource is the transmission resource provided by the secondary eNodeB, instruct the secondary eNodeB to establish a bearer between the secondary eNodeB and a terminal, and send data corresponding to the transmission resource that belongs to the first resource in the service data to the secondary eNodeB, so that the secondary eNodeB forwards the data to the terminal by using the established bearer.

The device further includes the traffic statistics collection module 547 and the traffic reporting module 548.

The traffic statistics collection module 547 is configured to collect the traffic statistics information respectively corresponding to the transmission resource that is used for transmitting the service data and belongs to the first resource and/or the transmission resource that is used for transmitting the service data and belongs to the non-first resource.

The traffic reporting module 548 is configured to report the traffic statistics information to the core network device 520.

In conclusion, according to the data offloading system provided in this embodiment, an access network device receives an offloading inclination indication of service data from a core network device; allocates, according to the offloading inclination indication, a transmission resource used for transmitting the service data; and transmits the service data by using the allocated transmission resource, which resolves a problem that QoS in a transmission process cannot be ensured when data is offloaded by using a first resource such as an unlicensed spectrum, a transmission resource provided by a WLAN, or a transmission resource provided by a secondary eNodeB, and achieves an effect that the QoS in the transmission process can be ensured even if the data is offloaded by using the first resource such as the unlicensed spectrum, the transmission resource provided by the WLAN, or the transmission resource provided by the secondary eNodeB.

According to the data offloading system provided in this embodiment, the offloading inclination indication is further carried by using a specific QoS class identifier QCI value, which reduces signal interaction between the core network device and the access network device, and reduces a demand for control resources. The access network device further reports traffic statistics information to the core network device, which helps implement an effect of differential charging or other statistics collection on the first resource and a non-first resource.

Figure 7:
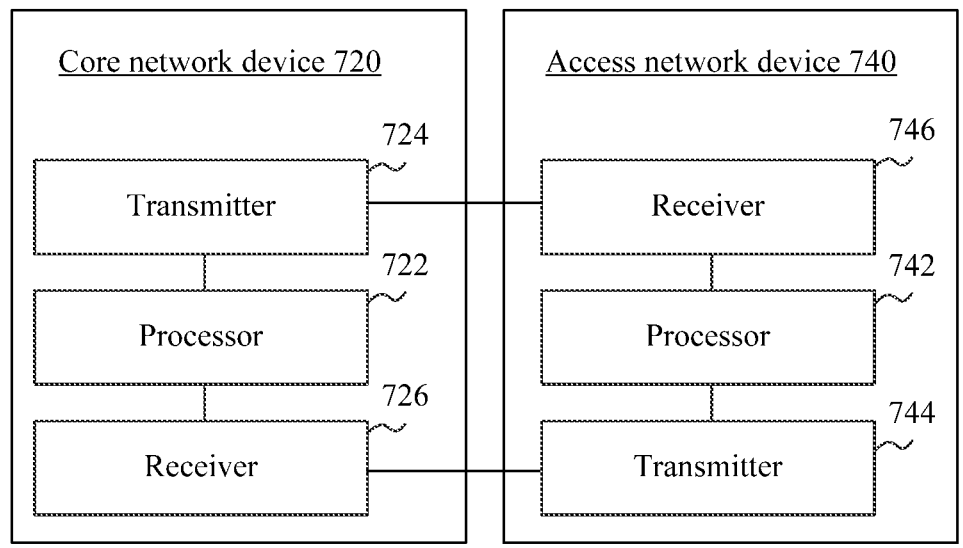
FIG. 7 is a schematic structural diagram of a data offloading system according to an embodiment of the present invention.

Referring to FIG. 7, FIG. 7 shows a schematic structural diagram of a data offloading system according to an embodiment of the present invention. This embodiment is described by using an example in which the access network device is the primary eNodeB 104 shown in FIG. 1A/FIG. 1B/FIG. 1C, or the access network device is the secondary eNodeB 108 shown in FIG. 2B/FIG. 2C. The system includes a core network device 720 and an access network device 740.

The core network device 720 includes a processor 722, a transmitter 724, and a receiver 726.

The processor 722 is configured to determine an offloading inclination indication of service data, wherein the offloading inclination indication is used to indicate a scheduling inclination of the service data on a first resource, and the first resource includes an LTE carrier in an unlicensed spectrum, a transmission resource provided by a WLAN, or a transmission resource provided by a secondary eNodeB. The service data mainly refers to downlink service data in this embodiment.

The transmitter 724 is configured to send the offloading inclination indication of the service data to the access network device 740, so that the access network device 740 allocates, according to the offloading inclination indication, a transmission resource used for transmitting the service data, and transmits the service data by using the allocated transmission resource.

The access network device 740 includes a processor 742, a transmitter 744, and a receiver 746.

The receiver 746 is configured to receive the offloading inclination indication of the service data, where the offloading inclination indication is used to indicate the scheduling inclination of the service data on the first resource, and the first resource includes the LTE carrier in the unlicensed spectrum, the transmission resource provided by the WLAN, or the transmission resource provided by the secondary eNodeB.

The processor 742 is configured to allocate, according to the offloading inclination indication, the transmission resource used for transmitting the service data.

The transmitter 744 is configured to transmit the service data by using the allocated transmission resource.

In conclusion, according to the data offloading system provided in this embodiment, an access network device receives an offloading inclination indication of service data from a core network device; allocates, according to the offloading inclination indication, a transmission resource used for transmitting the service data; and transmits the service data by using the allocated transmission resource, which resolves a problem that QoS in a transmission process cannot be ensured when data is offloaded by using a first resource such as an unlicensed spectrum, a transmission resource provided by a WLAN, or a transmission resource provided by a secondary eNodeB, and achieves an effect that the QoS in the transmission process can be ensured even if the data is offloaded by using the first resource such as the unlicensed spectrum, the transmission resource provided by the WLAN, or the transmission resource provided by the secondary eNodeB.

For the core network device 720:

In a more preferred implementation manner based on the embodiment shown in FIG. 7, the processor 722 is configured to: acquire QoS information of the service data, and generate the offloading inclination indication of the service data according to the QoS information. The offloading inclination indication includes: prohibiting scheduling on the first resource; or allowing scheduling on the first resource; or preferably performing scheduling on the first resource; or preferably performing scheduling on a non-first resource. However, if the service data includes uplink service data, the foregoing offloading inclination indication may be an uplink-downlink shared offloading inclination indication, or may include a downlink offloading inclination indication dedicated to a downlink and/or an uplink offloading inclination indication dedicated to an uplink.

In a more preferred implementation manner based on the embodiment shown in FIG. 7, the processor 722 is configured to: when the QoS information includes an aggregate maximum bit rate AMBR, an allocation/retention priority ARP, and a QoS class identifier QCI, if a rate indicated by the AMBR is greater than a first threshold, a priority indicated by the ARP is less than a first priority, and a delay indicated by the QCI is greater than a second threshold, generate the offloading inclination indication used to instruct to preferably perform scheduling on the first resource;

the processor 722 is configured to: when the QoS information includes a guaranteed bit rate GBR, generate the offloading inclination indication used to instruct to prohibit scheduling on the first resource;

the processor 722 is configured to: when the QoS information does not include the GBR, generate the offloading inclination indication used to instruct to allow scheduling on the first resource; or the processor 722 is configured to: when the QoS information does not include the GBR but includes the ARP and the QCI, if a priority indicated by the ARP is less than a second priority and a delay indicated by the QCI is less than a third threshold, generate the offloading inclination indication used to instruct to preferably perform scheduling on the non-first resource.

In a more preferred implementation manner based on the embodiment shown in FIG. 7, the transmitter 724 is configured to send the offloading inclination indication to a primary eNodeB; or the transmitter 724 is configured to forward the offloading inclination indication to the secondary eNodeB by using a primary eNodeB.

In a more preferred implementation manner based on the embodiment shown in FIG. 7, the receiver 726 is configured to receive traffic statistics information fed back by the access network device, where the traffic statistics information is fed back by the access network device after collecting traffic respectively corresponding to a transmission resource that is used for transmitting the service data and belongs to the first resource and/or a transmission resource that is used for transmitting the service data and belongs to the non-first resource.

In a more preferred implementation manner based on the embodiment shown in FIG. 7, the transmitter 724 is configured to send the traffic statistics information to a charging network element, so that the charging network element performs, according to the traffic statistics information, differential charging on the transmission resource that belongs to the first resource and/or the transmission resource that belongs to the non-first resource.

The offloading inclination indication is carried by using a specific QoS class identifier QCI value.

For the access network device 740:

In a more preferred implementation manner based on the embodiment shown in FIG. 7, the offloading inclination indication includes:

prohibiting scheduling on the first resource; or allowing scheduling on the first resource; or preferably performing scheduling on the first resource; or preferably performing scheduling on the non-first resource.

In a more preferred implementation manner based on the embodiment shown in FIG. 7, the processor 742 is configured to: when the offloading inclination indication is used to instruct to prohibit scheduling on the first resource, allocate a transmission resource that belongs to the non-first resource to the service data; or the processor 742 is configured to: when the offloading inclination indication is used to instruct to preferably perform scheduling on the first resource, preferably allocate a transmission resource that belongs to the first resource to the service data; or the processor 742 is configured to: when the offloading inclination indication is used to instruct to allow scheduling on the first resource, and the first resource is available, allocate a transmission resource that belongs to the first resource to the service data; or the processor 742 is configured to: when the offloading inclination indication is used to instruct to preferably perform scheduling on the non-first resource, preferably allocate a transmission resource that belongs to the non-first resource to the service data.

In a more preferred implementation manner based on the embodiment shown in FIG. 7, the transmitter 744 is configured to: when the transmission resource allocated by the processor 742 to the service data includes the transmission resource that belongs to the non-first resource, send, by using an LTE carrier in a licensed spectrum, data corresponding to the transmission resource that belongs to the non-first resource in the service data to a terminal;

the transmitter 744 is configured to: when the transmission resource allocated by the processor 742 to the service data includes the transmission resource that belongs to the first resource, and the first resource is the LTE carrier in the unlicensed spectrum, send, by using the LTE carrier in the unlicensed spectrum, data corresponding to the transmission resource that belongs to the first resource in the service data to a terminal;

the transmitter 744 is configured to: when the transmission resource allocated by the processor 742 to the service data includes the transmission resource that belongs to the first resource, and the first resource is the transmission resource provided by the WLAN, send data corresponding to the transmission resource that belongs to the first resource in the service data to a wireless access point of the WLAN, so that the wireless access point forwards the data to a terminal; or the transmitter 744 is configured to: when the transmission resource allocated by the processor 742 to the service data includes the transmission resource that belongs to the first resource, and the first resource is the transmission resource provided by the secondary eNodeB, instruct the secondary eNodeB to establish a bearer between the secondary eNodeB and a terminal, and send data corresponding to the transmission resource that belongs to the first resource in the service data to the secondary eNodeB, so that the secondary eNodeB forwards the data to the terminal by using the established bearer.

In a more preferred implementation manner based on the embodiment shown in FIG. 7, the receiver 742 is configured to receive the offloading inclination indication sent by the core network device; or the receiver 742 is configured to receive the offloading inclination indication forwarded by the core network device by using a primary eNodeB; or the receiver 742 is configured to receive the offloading inclination indication sent by a primary eNodeB, wherein the offloading inclination indication is generated by the primary eNodeB according to QoS information of the service data after the primary eNodeB receives the QoS information that is of the service data and is sent by the core network device.

In a more preferred implementation manner based on the embodiment shown in FIG. 7, if the service data includes both downlink service data and uplink service data, or the service data includes only uplink service data, the transmitter 744 is configured to, when the offloading inclination indication is an uplink-downlink shared offloading inclination indication, send the offloading inclination indication to the terminal, so that the terminal determines, according to the offloading inclination indication, a transmission resource used for transmitting the uplink service data, and transmits the uplink service data according to the determined transmission resource used for transmitting the uplink service data; or the transmitter 744 is configured to, when the offloading inclination indication includes a separate uplink offloading inclination indication, send the uplink offloading inclination indication in the offloading inclination indication to the terminal, so that the terminal determines, according to the uplink offloading inclination indication, a transmission resource used for transmitting the uplink service data, and transmits the uplink service data according to the determined transmission resource used for transmitting the uplink service data.

In a more preferred implementation manner based on the embodiment shown in FIG. 7, the processor 742 is configured to collect the traffic statistics information respectively corresponding to the transmission resource that is used for transmitting the service data and belongs to the first resource and/or the transmission resource that is used for transmitting the service data and belongs to the non-first resource; and the transmitter 744 is configured to report the traffic statistics information to the core network device.

Preferably, the offloading inclination indication is carried by using a specific QoS class identifier QCI value.

Figure 8:
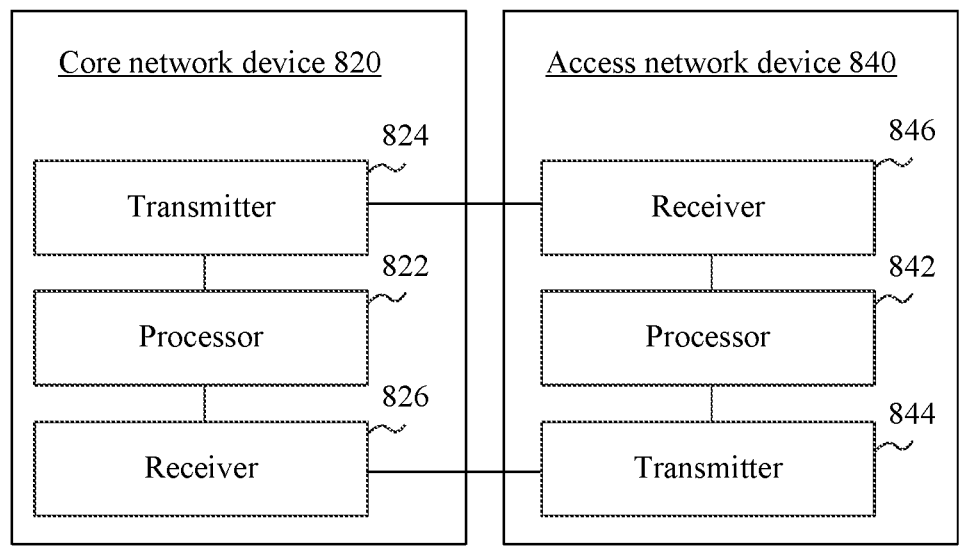
FIG. 8 is a schematic structural diagram of a data offloading system according to an embodiment of the present invention.

Referring to FIG. 8, FIG. 8 shows a schematic structural diagram of a data offloading system according to an embodiment of the present invention. This embodiment is described by using an example in which the access network device is the primary eNodeB 104 shown in FIG. 1A/FIG. 1B/FIG. 1C, or the access network device is the secondary eNodeB 108 shown in FIG. 2B/FIG. 2C. The system includes a core network device 820 and an access network device 840.

The core network device 820 includes a processor 822, a transmitter 824, and a receiver 826.

The processor 822 is configured to control the transmitter 824 to send QoS information of service data to the access network device 840.

The access network device 840 includes a processor 842, a transmitter 844, and a receiver 846.

The receiver 846 is configured to receive the QoS information of the service data. The QoS information includes but is not limited to a QCI (QoS Class Identifier), a GBR (Guaranteed Bit Rate), an AMBR (Aggregate Maximum Bit Rate), and an ARP (allocation/retention priority).

The processor 842 is configured to allocate, according to the QoS information, a transmission resource used for transmitting the service data, where the transmission resource includes a transmission resource that belongs to a first resource and a transmission resource that belongs to a non-first resource, and the first resource includes an LTE carrier in an unlicensed spectrum, a transmission resource provided by a WLAN, or a transmission resource provided by a secondary eNodeB.

The transmitter 844 is configured to transmit the service data by using the allocated transmission resource.

In conclusion, according to the data offloading system provided in this embodiment, an access network device receives QoS information from a core network device; allocates, according to the QoS information, a transmission resource used for transmitting service data; and transmits the service data by using the allocated transmission resource, which resolves a problem that QoS in a transmission process cannot be ensured when data is offloaded by using a first resource such as an unlicensed spectrum, a transmission resource provided by a WLAN, or a transmission resource provided by a secondary eNodeB, and achieves an effect that the QoS in the transmission process can be ensured even if the data is offloaded by using the first resource such as the unlicensed spectrum, the transmission resource provided by the WLAN, or the transmission resource provided by the secondary eNodeB.

For the core network device 820:

In a more preferred embodiment based on what is provided in FIG. 8, the receiver 826 is configured to receive traffic statistics information fed back by the access network device 840, where the traffic statistics information is fed back by the access network device 840 after collecting traffic respectively corresponding to the transmission resource that is used for transmitting the service data and belongs to the first resource and/or the transmission resource that is used for transmitting the service data and belongs to the non-first resource.

When the core network device is a mobility management entity MME, the transmitter 824 is configured to send the traffic statistics information to a charging network element, so that the charging network element performs, according to the traffic statistics information, differential charging on the transmission resource that belongs to the first resource and/or the transmission resource that belongs to the non-first resource.

For the access network device 840:

In a more preferred embodiment based on what is provided in FIG. 8, the processor 842 is configured to: when the QoS information includes the aggregate maximum bit rate AMBR, the allocation/retention priority ARP, and the QoS class identifier QCI, if a rate indicated by the AMBR is greater than a first threshold, a priority indicated by the ARP is less than a first priority, and a delay indicated by the QCI is greater than a second threshold, preferably allocate the transmission resource that belongs to the first resource to the service data;

the processor 842 is configured to: when the QoS information includes the guaranteed bit rate GBR, allocate the transmission resource that belongs to the non-first resource to the service data;

the processor 842 is configured to: when the QoS information does not include the GBR, and the first resource is available, allocate the transmission resource that belongs to the first resource to the service data; or the processor 842 is configured to: when the QoS information does not include the GBR but includes the ARP and the QCI, if a priority indicated by the ARP is less than a second priority and a delay indicated by the QCI is less than a third threshold, preferably allocate the transmission resource that belongs to the non-first resource to the service data.

In a more preferred embodiment based on what is provided in FIG. 8, the transmitter 844 is configured to: when the transmission resource allocated by the processor 842 to the service data includes the transmission resource that belongs to the non-first resource, send, by using an LTE carrier in a licensed spectrum, data corresponding to the transmission resource that belongs to the non-first resource in the service data to a terminal;

the transmitter 844 is configured to: when the transmission resource allocated by the processor 842 to the service data includes the transmission resource that belongs to the first resource, and the first resource is the LTE carrier in the unlicensed spectrum, send, by using the LTE carrier in the unlicensed spectrum, data corresponding to the transmission resource that belongs to the first resource in the service data to a terminal;

the transmitter 844 is configured to: when the transmission resource allocated by the processor 842 to the service data includes the transmission resource that belongs to the first resource, and the first resource is the transmission resource provided by the WLAN, send data corresponding to the transmission resource that belongs to the first resource in the service data to a wireless access point of the WLAN, so that the wireless access point forwards the data to a terminal; or the transmitter 844 is configured to: when the transmission resource allocated by the processor 842 to the service data includes the transmission resource that belongs to the first resource, and the first resource is the transmission resource provided by the secondary eNodeB, instruct the secondary eNodeB to establish a bearer between the secondary eNodeB and a terminal, and send data corresponding to the transmission resource that belongs to the first resource in the service data to the secondary eNodeB, so that the secondary eNodeB forwards the data to the terminal by using the established bearer.

In a more preferred embodiment based on what is provided in FIG. 8, the receiver 846 is configured to receive the QoS information sent by the core network device; or receive the QoS information forwarded by the core network device by using a primary eNodeB.

In a more preferred embodiment based on what is provided in FIG. 8, the processor 842 is further configured to collect the traffic statistics information respectively corresponding to the transmission resource that is used for transmitting the service data and belongs to the first resource and/or the transmission resource that is used for transmitting the service data and belongs to the non-first resource;

the transmitter 844 is further configured to report the traffic statistics information to the core network device.

Figure 9:
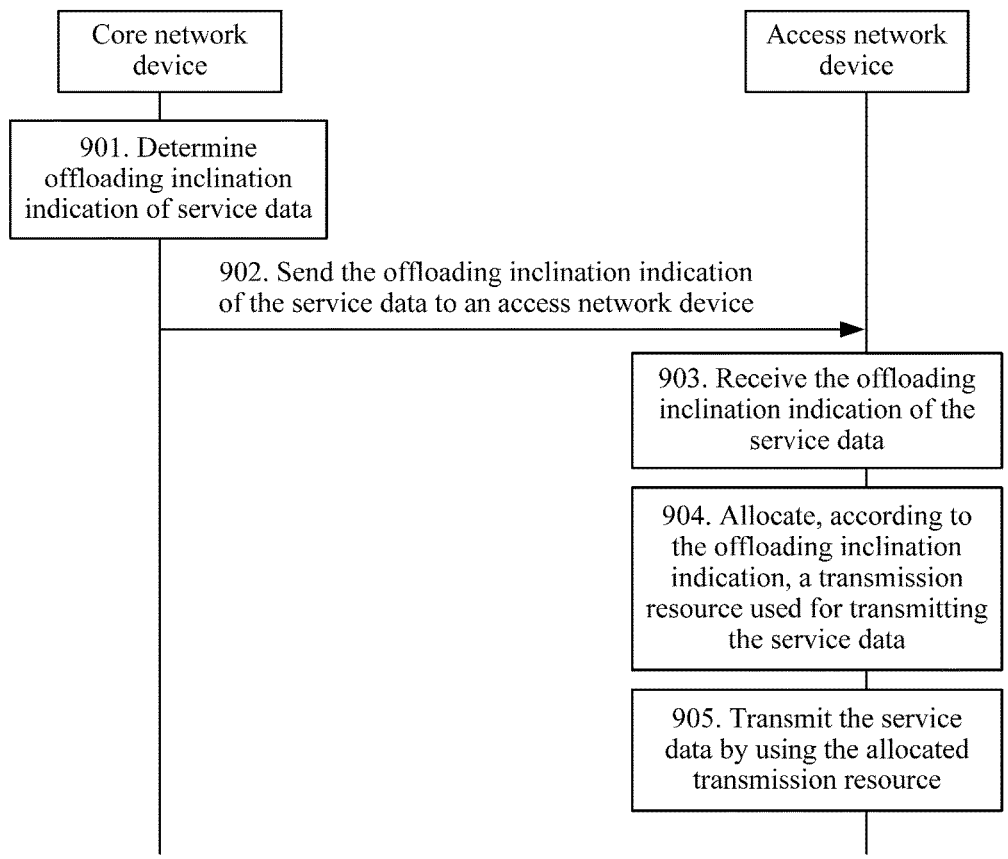
FIG. 9 is a method flowchart of a data offloading method according to an embodiment of the present invention.

Referring to FIG. 9, FIG. 9 shows a method flowchart of a data offloading method according to an embodiment of the present invention. This embodiment is described by using an example in which the data offloading method is applied to the core network device 102 and the primary eNodeB 104 shown in FIG. 1A/FIG. 1B/FIG. 1C, or the core network device 102 and the secondary eNodeB 108 shown in FIG. 2B/FIG. 2C. The method includes:

Step 901: A core network device determines an offloading inclination indication of service data.

The offloading inclination indication is used to indicate a scheduling inclination of the service data on a first resource, and the first resource includes an LTE carrier in an unlicensed spectrum, a transmission resource provided by a WLAN, or a transmission resource provided by a secondary eNodeB.

Step 902: The core network device sends the offloading inclination indication of the service data to an access network device.

Step 903: The access network device receives the offloading inclination indication of the service data.

Step 904: The access network device allocates, according to the offloading inclination indication, a transmission resource used for transmitting the service data.

Step 905: The access network device transmits the service data by using the allocated transmission resource.

In conclusion, according to the data offloading method provided in this embodiment, an access network device receives an offloading inclination indication of service data from a core network device; allocates, according to the offloading inclination indication, a transmission resource used for transmitting the service data; and transmits the service data by using the allocated transmission resource, which resolves a problem that QoS in a transmission process cannot be ensured when data is offloaded by using a first resource such as an unlicensed spectrum, a transmission resource provided by a WLAN, or a transmission resource provided by a secondary eNodeB, and achieves an effect that the QoS in the transmission process can be ensured even if the data is offloaded by using the first resource such as the unlicensed spectrum, the transmission resource provided by the WLAN, or the transmission resource provided by the secondary eNodeB.

Figure 10:
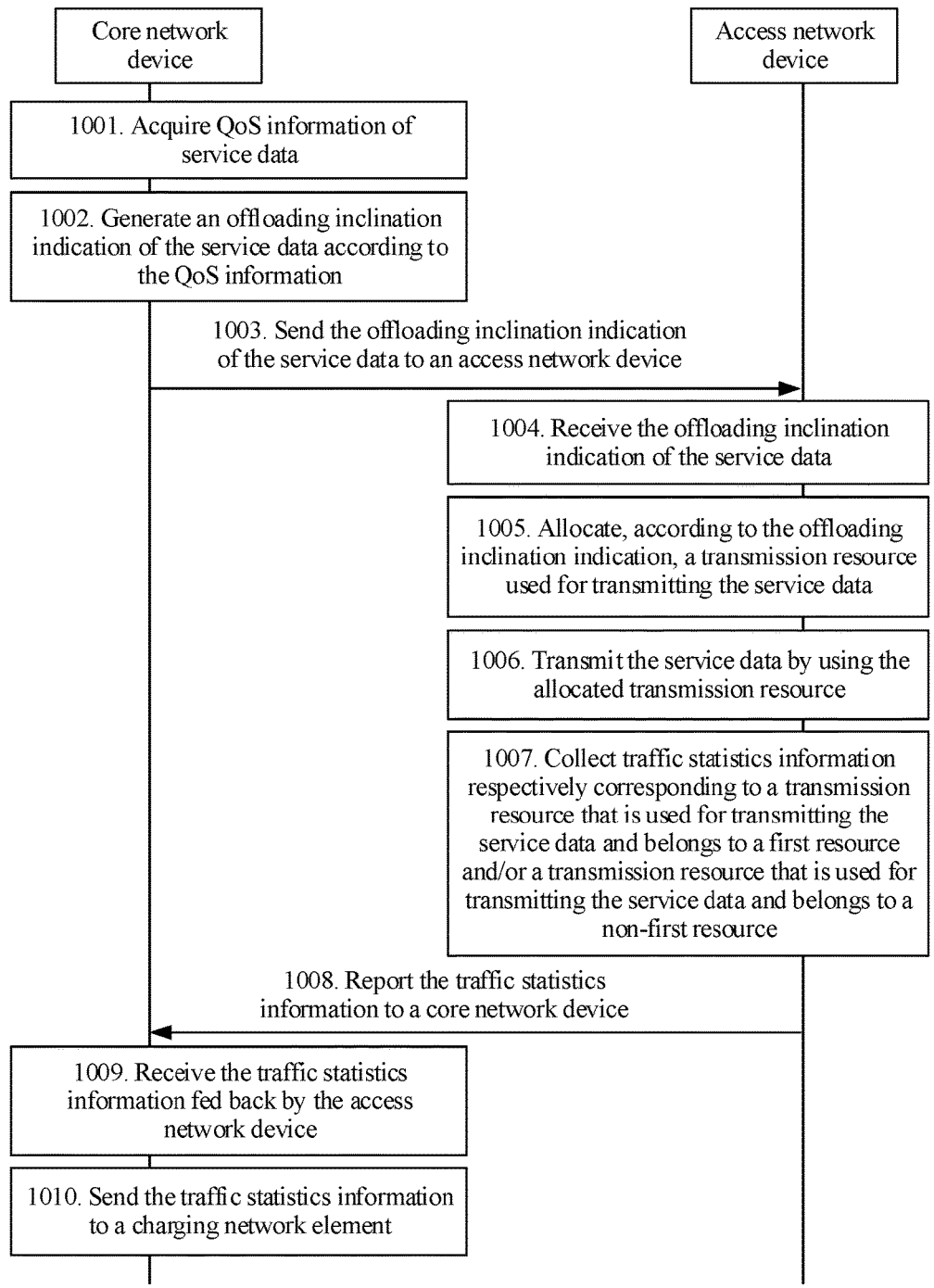
FIG. 10 is a method flowchart of a data offloading method according to another embodiment of the present invention.

Referring to FIG. 10, FIG. 10 shows a method flowchart of a data offloading method according to another embodiment of the present invention. This embodiment is described by using an example in which the data offloading method is applied to the core network device 102 and the primary eNodeB 104 shown in FIG. 1A/FIG. 1B/FIG. 1C, or the core network device 102 and the secondary eNodeB 108 shown in FIG. 2B/FIG. 2C. The method includes:

Step 1001: A core network device acquires QoS information of service data.

The QoS information includes but is not limited to:

a QCI (QoS Class Identifier), a GBR (Guaranteed Bit Rate), an AMBR (Aggregate Maximum Bit Rate), and an ARP (allocation/retention priority).

Step 1002: The core network device generates an offloading inclination indication of the service data according to the QoS information.

The offloading inclination indication is used to indicate a scheduling inclination of the service data on a first resource, and the first resource includes an LTE carrier in an unlicensed spectrum, a transmission resource provided by a WLAN, or a transmission resource provided by a secondary eNodeB.

When the QoS information includes the AMBR, the ARP, and the QCI, if a rate indicated by the AMBR is greater than a first threshold, a priority indicated by the ARP is less than a first priority, and a delay indicated by the QCI is greater than a second threshold, the core network device generates an offloading inclination indication used to instruct to preferably perform scheduling on the first resource.

When the QoS information includes the GBR, the core network device generates an offloading inclination indication used to instruct to prohibit scheduling on the first resource.

When the QoS information does not include the GBR, the core network device generates an offloading inclination indication used to instruct to allow scheduling on the first resource.

When the QoS information does not include the GBR but includes the ARP and the QCI, if a priority indicated by the ARP is less than a second priority and a delay indicated by the QCI is less than a third threshold, the core network device generates an offloading inclination indication used to instruct to preferably perform scheduling on a non-first resource.

It should be noted that according to different QoS information, a specific manner of conditions according to which the foregoing four offloading inclination indications are generated is not limited in this step. In different embodiments or during implementation performed by different persons skilled in the art, the foregoing conditions may be different.

Step 1003: The core network device sends the offloading inclination indication of the service data to an access network device.

The core network device sends the offloading inclination indication of the service data to the access network device by carrying the offloading inclination indication in a specific QoS class identifier QCI value. The specific QoS class identifier QCI value may be a newly-added QCI value.

When the access network device is the primary eNodeB shown in the FIG. 1 series, the core network device sends the offloading inclination indication to the primary eNodeB. When the access network device is the secondary eNodeB shown in the FIG. 2 series, the core network device forwards the offloading inclination indication to the secondary eNodeB by using a primary eNodeB. That is, the core network device first sends the offloading inclination indication to the primary eNodeB, and then the primary eNodeB forwards the offloading inclination indication to the secondary eNodeB.

Step 1004: The access network device receives the offloading inclination indication of the service data.

When the access network device is the primary eNodeB shown in the FIG. 1 series, the primary eNodeB receives the offloading inclination indication sent by the core network device. When the access network device is the secondary eNodeB shown in the FIG. 2 series, the secondary eNodeB receives the offloading inclination indication forwarded by the core network device by using the primary eNodeB.

In another possible implementation manner, the core network device may directly send the QoS information of the service data to the primary eNodeB, the primary eNodeB generates the offloading inclination indication according to the QoS information of the service data, and then the primary eNodeB sends the offloading inclination indication to the secondary eNodeB. In this case, the secondary eNodeB receives the offloading inclination indication sent by the primary eNodeB, where the offloading inclination indication is generated by the primary eNodeB according to the QoS information of the service data after the primary eNodeB receives the QoS information that is of the service data and is sent by the core network device.

Step 1005: The access network device allocates, according to the offloading inclination indication, a transmission resource used for transmitting the service data.

The offloading inclination indication includes: prohibiting scheduling on the first resource; or allowing scheduling on the first resource; or preferably performing scheduling on the first resource; or preferably performing scheduling on the non-first resource.

When the offloading inclination indication is used to instruct to prohibit scheduling on the first resource, the access network device allocates a transmission resource that belongs to the non-first resource to the service data.

When the offloading inclination indication is used to instruct to preferably perform scheduling on the first resource, the access network device preferably allocates a transmission resource that belongs to the first resource to the service data.

When the offloading inclination indication is used to instruct to allow scheduling on the first resource, and the first resource is available, a transmission resource that belongs to the first resource is allocated to the service data.

When the offloading inclination indication is used to instruct to preferably perform scheduling on the non-first resource, the access network device preferably allocates a transmission resource that belongs to the non-first resource to the service data.

Step 1006: The access network device transmits the service data by using the allocated transmission resource.

When the transmission resource allocated to the service data includes the transmission resource that belongs to the non-first resource, the access network device sends, by using an LTE carrier in a licensed spectrum, data corresponding to the transmission resource that belongs to the non-first resource in the service data to a terminal.

When the transmission resource allocated to the service data includes the transmission resource that belongs to the first resource, and the first resource is the LTE carrier in the unlicensed spectrum, the access network device sends, by using the LTE carrier in the unlicensed spectrum, data corresponding to the transmission resource that belongs to the first resource in the service data to a terminal.

When the transmission resource allocated to the service data includes the transmission resource that belongs to the first resource, and the first resource is the transmission resource provided by the WLAN, the access network device sends data corresponding to the transmission resource that belongs to the first resource in the service data to a wireless access point of the WLAN, so that the wireless access point forwards the data to a terminal.

When the transmission resource allocated to the service data includes the transmission resource that belongs to the first resource, and the first resource is the transmission resource provided by the secondary eNodeB, the access network device (the primary eNodeB) instructs the secondary eNodeB to establish a bearer between the secondary eNodeB and a terminal, and sends data corresponding to the transmission resource that belongs to the first resource in the service data to the secondary eNodeB, so that the secondary eNodeB forwards the data to the terminal by using the established bearer.

It should be additionally noted that, if the service data further includes uplink service data, after the offloading inclination indication of the service data is received, the method further includes:

sending, by the access network device when the offloading inclination indication is an uplink-downlink shared offloading inclination indication, the offloading inclination indication to the terminal, so that the terminal determines, according to the offloading inclination indication, a transmission resource used for transmitting the uplink service data, and transmits the uplink service data according to the determined transmission resource used for transmitting the uplink service data; or sending, by the access network device when the offloading inclination indication includes a separate uplink offloading inclination indication, the uplink offloading inclination indication in the offloading inclination indication to the terminal, so that the terminal determines, according to the uplink offloading inclination indication, a transmission resource used for transmitting the uplink service data, and transmits the uplink service data according to the determined transmission resource used for transmitting the uplink service data.

Certainly, in a scenario in which the service data includes only the uplink service data, the access network device may send only the offloading inclination indication to the terminal.

Step 1007: The access network device collects traffic statistics information respectively corresponding to a transmission resource that is used for transmitting the service data and belongs to a first resource and/or a transmission resource that is used for transmitting the service data and belongs to a non-first resource.

The traffic statistics information may be a ratio of traffic corresponding to the transmission resource that belongs to the first resource in total traffic; or the traffic statistics information may be a ratio of traffic corresponding to the transmission resource that belongs to the non-first resource in total traffic; or the traffic statistics information may be a ratio of traffic corresponding to the transmission resource that belongs to the first resource to traffic corresponding to the transmission resource that belongs to the non-first resource. As long as the traffic statistics information can indicate a traffic statistics result, a specific form of the traffic statistics information is not limited.

Step 1008: The access network device reports the traffic statistics information to the core network device.

When the access network device is the primary eNodeB shown in the FIG. 1 series, the access network device directly reports the traffic statistics information to the core network device. When the access network device is the secondary eNodeB shown in the FIG. 2 series, the access network device reports the traffic statistics information to the core network device by using a primary eNodeB.

Step 1009: The core network device receives the traffic statistics information fed back by the access network device.

The traffic statistics information is fed back by the access network device after collecting traffic respectively corresponding to the transmission resource that is used for transmitting the service data and belongs to the first resource and/or the transmission resource that is used for transmitting the service data and belongs to the non-first resource.

When the access network device is the primary eNodeB shown in the FIG. 1 series, the core network device receives the traffic statistics information directly reported by the primary eNodeB. When the access network device is the secondary eNodeB shown in the FIG. 2 series, the core network device receives the traffic statistics information reported by the secondary eNodeB by using the primary eNodeB.

Step 1010: The core network device sends the traffic statistics information to a charging network element.

Because the traffic statistics information may be used for multiple purposes such as charging and statistics collection of transmission resource use, how the core network device uses the traffic statistics information is not specifically limited. For example, the traffic statistics information is used for charging. When the core network device is a mobility management entity (MME), the MME may send the traffic statistics information to the charging network element, so that the charging network element performs, according to the traffic statistics information, differential charging on the transmission resource that belongs to the first resource and/or the transmission resource that belongs to the non-first resource.

In conclusion, according to the data offloading method provided in this embodiment, an access network device receives an offloading inclination indication of service data from a core network device; allocates, according to the offloading inclination indication, a transmission resource used for transmitting the service data; and transmits the service data by using the allocated transmission resource, which resolves a problem that QoS in a transmission process cannot be ensured when data is offloaded by using a first resource such as an unlicensed spectrum, a transmission resource provided by a WLAN, or a transmission resource provided by a secondary eNodeB, and achieves an effect that the QoS in the transmission process can be ensured even if the data is offloaded by using the first resource such as the unlicensed spectrum, the transmission resource provided by the WLAN, or the transmission resource provided by the secondary eNodeB.

According to the data offloading method provided in this embodiment, the core network device further generates the offloading inclination indication according to QoS information, which can effectively ensure the QoS of the service data. The offloading inclination indication is further sent to a terminal, so that the QoS is ensured when the service data includes uplink service data. The offloading inclination indication is further carried by using a specific QoS class identifier (QCI) value, which reduces signal interaction between the core network device and the access network device, and reduces a demand for control resources. The access network device further reports traffic statistics information to the core network device, which helps implement an effect of differential charging or other statistics collection on the first resource and a non-first resource.

It should be noted that the foregoing step 1001, step 1002, step 1003, step 1009, and step 1010 may be separately implemented to form the data offloading method on a core network device side, and the foregoing step 1004, step 1005, step 1006, step 1007, and step 1008 may be separately implemented to form the data offloading method on an access network device side.

Figure 11:
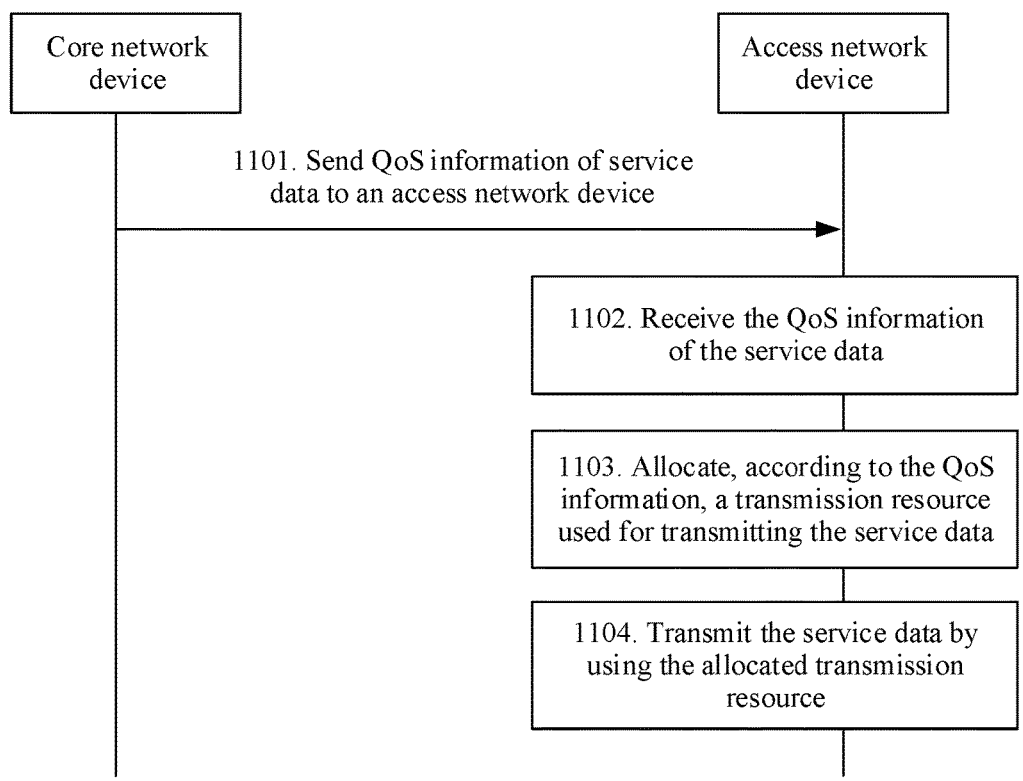
FIG. 11 is a method flowchart of a data offloading method according to an embodiment of the present invention.

Referring to FIG. 11, FIG. 11 shows a method flowchart of a data offloading method according to an embodiment of the present invention. This embodiment is described by using an example in which the data offloading method is applied to the core network device 102 and the primary eNodeB 104 shown in FIG. 1A/FIG. 1B/FIG. 1C, or the core network device 102 and the secondary eNodeB 108 shown in FIG. 2B/FIG. 2C. The method includes:

Step 1101: A core network device sends QoS information of service data to an access network device.

Step 1102: The access network device receives the QoS information of the service data.

Step 1103: The access network device allocates, according to the QoS information, a transmission resource used for transmitting the service data.

The transmission resource includes a transmission resource that belongs to a first resource and a transmission resource that belongs to a non-first resource, and the first resource includes an LTE carrier in an unlicensed spectrum, a transmission resource provided by a WLAN, or a transmission resource provided by a secondary eNodeB.

Step 1104: The access network device transmits the service data by using the allocated transmission resource.

In conclusion, according to the data offloading method provided in this embodiment, an access network device receives QoS information from a core network device; allocates, according to the QoS information, a transmission resource used for transmitting service data; and transmits the service data by using the allocated transmission resource, which resolves a problem that QoS in a transmission process cannot be ensured when data is offloaded by using a first resource such as an unlicensed spectrum, a transmission resource provided by a WLAN, or a transmission resource provided by a secondary eNodeB, and achieves an effect that the QoS in the transmission process can be ensured even if the data is offloaded by using the first resource such as the unlicensed spectrum, the transmission resource provided by the WLAN, or the transmission resource provided by the secondary eNodeB.

Figure 12:
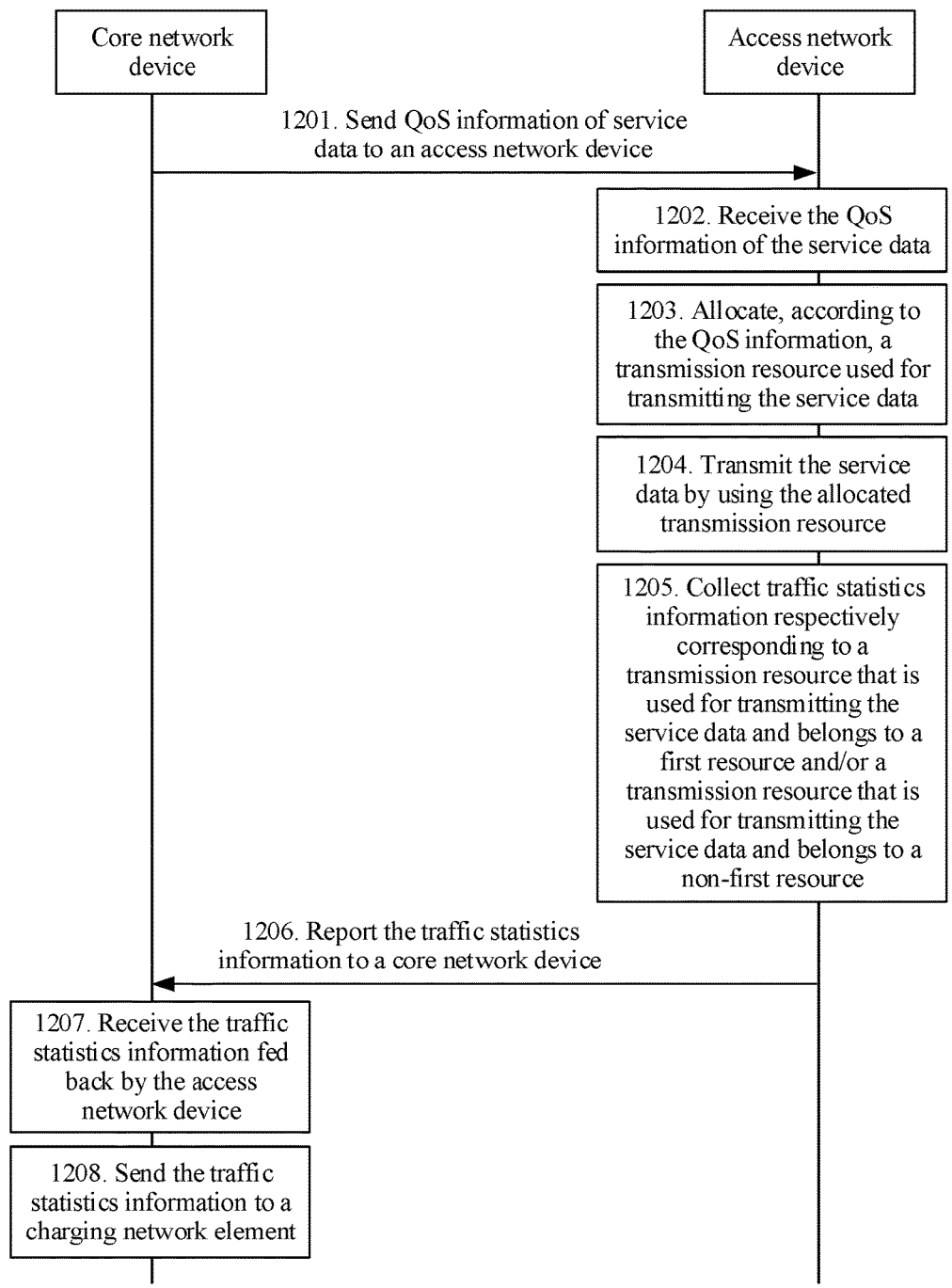
FIG. 12 is a method flowchart of a data offloading method according to another embodiment of the present invention.

Referring to FIG. 12, FIG. 12 shows a method flowchart of a data offloading method according to an embodiment of the present invention. This embodiment is described by using an example in which the data offloading method is applied to the core network device 102 and the primary eNodeB 104 shown in FIG. 1A/FIG. 1B/FIG. 1C, or the core network device 102 and the secondary eNodeB 108 shown in FIG. 2B/FIG. 2C. The method includes:

Step 1201: A core network device sends QoS information of service data to an access network device.

The QoS information includes but is not limited to:
a QCI (QoS Class Identifier),
a GBR (Guaranteed Bit Rate),
an AMBR (Aggregate Maximum Bit Rate), and
an ARP (allocation/retention priority).

When the access network device is a primary eNodeB, the core network device directly sends the QoS information to the access network device. When the access network device is a secondary eNodeB, the core network device forwards the QoS information to the access network device by using a primary eNodeB.

Step 1202: The access network device receives the QoS information of the service data.

When the access network device is a primary eNodeB, the access network device receives the QoS information directly sent by the core network device. When the access network device is a secondary eNodeB, the access network device receives the QoS information forwarded by the core network device by using the primary eNodeB.

Step 1203: The access network device allocates, according to the QoS information, a transmission resource used for transmitting the service data.

The transmission resource includes a transmission resource that belongs to a first resource and a transmission resource that belongs to a non-first resource, and the first resource includes an LTE carrier in an unlicensed spectrum, a transmission resource provided by a WLAN, or a transmission resource provided by a secondary eNodeB.

When the QoS information includes the AMBR, the ARP, and the QCI, if a rate indicated by the AMBR is greater than a first threshold, a priority indicated by the ARP is less than a first priority, and a delay indicated by the QCI is greater than a second threshold, the transmission resource that belongs to the first resource is preferably allocated to the service data.

When the QoS information includes the GBR, the transmission resource that belongs to the non-first resource is allocated to the service data.

When the QoS information does not include the GBR, and the first resource is available, the transmission resource that belongs to the first resource is allocated to the service data.

When the QoS information does not include the GBR but includes the ARP and the QCI, if a priority indicated by the ARP is less than a second priority and a delay indicated by the QCI is less than a third threshold, the transmission resource that belongs to the non-first resource is preferably allocated to the service data.

It should be noted that according to different QoS information, a specific manner of a condition according to which the transmission resource is allocated is not limited in this step. In different embodiments or during implementation performed by different persons skilled in the art, the foregoing condition may vary. However, if the service data includes uplink service data, the foregoing offloading inclination indication may be an uplink-downlink shared offloading inclination indication, or may include a downlink offloading inclination indication dedicated to a downlink and/or an uplink offloading inclination indication dedicated to an uplink.

Step 1204: The access network device transmits the service data by using the allocated transmission resource.

When the transmission resource allocated to the service data includes the transmission resource that belongs to the non-first resource, the access network device sends, by using an LTE carrier in a licensed spectrum, data corresponding to the transmission resource that belongs to the non-first resource in the service data to a terminal.

When the transmission resource allocated to the service data includes the transmission resource that belongs to the first resource, and the first resource is the LTE carrier in the unlicensed spectrum, the access network device sends, by using the LTE carrier in the unlicensed spectrum, data corresponding to the transmission resource that belongs to the first resource in the service data to a terminal.

When the transmission resource allocated to the service data includes the transmission resource that belongs to the first resource, and the first resource is the transmission resource provided by the WLAN, the access network device sends data corresponding to the transmission resource that belongs to the first resource in the service data to a wireless access point of the WLAN, so that the wireless access point forwards the data to a terminal.

When the transmission resource allocated to the service data includes the transmission resource that belongs to the first resource, and the first resource is the transmission resource provided by the secondary eNodeB, the access network device (the primary eNodeB) instructs the secondary eNodeB to establish a bearer between the secondary eNodeB and a terminal, and sends data corresponding to the transmission resource that belongs to the first resource in the service data to the secondary eNodeB, so that the secondary eNodeB forwards the data to the terminal by using the established bearer.

Step 1205: The access network device collects traffic statistics information respectively corresponding to a transmission resource that is used for transmitting the service data and belongs to a first resource and/or a transmission resource that is used for transmitting the service data and belongs to a non-first resource.

The traffic statistics information may be a ratio of traffic corresponding to the transmission resource that belongs to the first resource in total traffic; or the traffic statistics information may be a ratio of traffic corresponding to the transmission resource that belongs to the non-first resource in total traffic; or the traffic statistics information may be a ratio of traffic corresponding to the transmission resource that belongs to the first resource to traffic corresponding to the transmission resource that belongs to the non-first resource. As long as the traffic statistics information can indicate a traffic statistics result, a specific form of the traffic statistics information is not limited.

Step 1206: The access network device reports the traffic statistics information to the core network device.

When the access network device is the primary eNodeB shown in the FIG. 1 series, the access network device directly reports the traffic statistics information to the core network device. When the access network device is the secondary eNodeB shown in the FIG. 2 series, the access network device reports the traffic statistics information to the core network device by using a primary eNodeB.

Step 1207: The core network device receives the traffic statistics information fed back by the access network device.

The traffic statistics information is fed back by the access network device after collecting traffic respectively corresponding to the transmission resource that is used for transmitting the service data and belongs to the first resource and/or the transmission resource that is used for transmitting the service data and belongs to the non-first resource.

When the access network device is the primary eNodeB shown in the FIG. 1 series, the core network device receives the traffic statistics information directly reported by the primary eNodeB. When the access network device is the secondary eNodeB shown in the FIG. 2 series, the core network device receives the traffic statistics information reported by the secondary eNodeB by using the primary eNodeB.

Step 1208: The core network device sends the traffic statistics information to a charging network element.

Because the traffic statistics information may be used for multiple purposes such as charging and statistics collection of transmission resource use, how the core network device uses the traffic statistics information is not specifically limited. For example, the traffic statistics information is used for charging. When the core network device is a mobility management entity (MME), the MME may send the traffic statistics information to the charging network element, so that the charging network element performs, according to the traffic statistics information, differential charging on the transmission resource that belongs to the first resource and/or the transmission resource that belongs to the non-first resource.

In conclusion, according to the data offloading method provided in this embodiment, an access network device receives an offloading inclination indication of service data from a core network device; allocates, according to the offloading inclination indication, a transmission resource used for transmitting the service data; and transmits the service data by using the allocated transmission resource, which resolves a problem that QoS in a transmission process cannot be ensured when data is offloaded by using a first resource such as an unlicensed spectrum, a transmission resource provided by a WLAN, or a transmission resource provided by a secondary eNodeB, and achieves an effect that the QoS in the transmission process can be ensured even if the data is offloaded by using the first resource such as the unlicensed spectrum, the transmission resource provided by the WLAN, or the transmission resource provided by the secondary eNodeB.

According to the data offloading method provided in this embodiment, the offloading inclination indication is further carried by using a specific QoS class identifier (QCI) value, which reduces signal interaction between the core network device and the access network device, and reduces a demand for control resources. The access network device further reports traffic statistics information to the core network device, which helps implement an effect of differential charging or other statistics collection on the first resource and a non-first resource.

A person of ordinary skill in the art may understand that all or some of the steps of the embodiments may be implemented by hardware or a program instructing related hardware. The program may be stored in a computer-readable storage medium. The storage medium may include a read-only memory, a magnetic disk, or an optical disc.

The foregoing descriptions are merely exemplary embodiments of the present invention, but are not intended to limit the present invention. Any modification, equivalent replacement, and improvement made without departing from the spirit and principle of the present invention shall fall within the protection scope of the present invention.

What is claimed is:

1. An access network device, wherein the device comprises:
 a receiver configured to receive quality of service (QoS) information of service data;
 a processor configured to allocate, according to the QoS information, a transmission resource used for transmitting the service data, wherein the transmission resource comprises a transmission resource that belongs to a first resource and a transmission resource that belongs to a non-first resource, and the first resource comprises a carrier in an unlicensed spectrum, a transmission resource provided by a wireless local area network (WLAN), or a transmission resource provided by a secondary eNodeB; and
 a transmitter configured to transmit the service data by using the allocated transmission resource.

2. The device according to claim 1, wherein the processor is configured to do one of the following:
 preferably allocate the transmission resource that belongs to the first resource to the service data when the QoS information comprises an aggregate maximum bit rate (AMBR), an allocation/retention priority (ARP), and a QoS class identifier (QCI), if a rate indicated by the AMBR is greater than a first threshold, a priority indicated by the ARP is less than a first priority, and a delay indicated by the QCI is greater than a second threshold;
 allocate the transmission resource that belongs to the non-first resource to the service data when the QoS information comprises a guaranteed bit rate (GBR);

allocate the transmission resource that belongs to the first resource to the service data when the QoS information does not comprise a guaranteed bit rate (GBR) and the first resource is available;

preferably allocate the transmission resource that belongs to the non-first resource to the service data when the QoS information does not comprise a guaranteed bit rate GBR but comprises an allocation/retention priority (ARP) and a QoS class identifier (QCI), if a priority indicated by the ARP is less than a second priority and a delay indicated by the QCI is less than a third threshold.

3. The device according to claim 2, wherein the transmitter is configured to do one of the following:

send data corresponding to the transmission resource that belongs to the non-first resource in the service data to a terminal using a carrier in a licensed spectrum when the transmission resource allocated to the service data comprises the transmission resource that belongs to the non-first resource;

send data corresponding to the transmission resource that belongs to the first resource in the service data to a terminal using the carrier in the unlicensed spectrum when the transmission resource allocated to the service data comprises the transmission resource that belongs to the first resource, and the first resource is the carrier in the unlicensed spectrum;

send data corresponding to the transmission resource that belongs to the first resource in the service data to a wireless access point of the WLAN so that the wireless access point forwards the data to a terminal when the transmission resource allocated to the service data comprises the transmission resource that belongs to the first resource, and the first resource is the transmission resource provided by the WLAN;

instruct the secondary eNodeB to establish a bearer between the secondary eNodeB and a terminal and send data corresponding to the transmission resource that belongs to the first resource in the service data to the secondary eNodeB so that the secondary eNodeB forwards the data to the terminal by using the established bearer when the transmission resource allocated to the service data comprises the transmission resource that belongs to the first resource, and the first resource is the transmission resource provided by the secondary eNodeB.

4. The device according to any one of claims 1 to 3, wherein the receiver is configured to receive the QoS information sent by a core network device; or the receiver is configured to receive the QoS information forwarded by a core network device by using a primary eNodeB.

5. A data offloading method, wherein the method comprises:

receiving quality of service (QoS) information of service data;

allocating a transmission resource used for transmitting the service data according to the QoS information, wherein the transmission resource comprises a transmission resource that belongs to a first resource and a transmission resource that belongs to a non-first resource, and the first resource comprises a carrier in an unlicensed spectrum, a transmission resource provided by a wireless local area network (WLAN), or a transmission resource provided by a secondary eNodeB; and transmitting the service data by using the allocated transmission resource.

6. The method according to claim 5, wherein the allocating a transmission resource used for transmitting the service data according to the QoS information comprises:

preferably allocating the transmission resource that belongs to the first resource to the service data when the QoS information comprises an aggregate maximum bit rate (AMBR), an allocation/retention priority (ARP), and a QoS class identifier (QCI), if a rate indicated by the AMBR is greater than a first threshold, a priority indicated by the ARP is less than a first priority, and a delay indicated by the QCI is greater than a second threshold; or allocating the transmission resource that belongs to the non-first resource to the service data when the QoS information comprises a guaranteed bit rate (GBR); or allocating the transmission resource that belongs to the first resource to the service data when the QoS information does not comprise a guaranteed bit rate (GBR) and the first resource is available; or preferably allocating the transmission resource that belongs to the non-first resource to the service data when the QoS information does not comprise the a guaranteed bit rate (GBR) but comprises an allocation/retention priority (ARP) and a QoS class identifier (QCI), if a priority indicated by the ARP is less than a second priority and a delay indicated by the QCI is less than a third threshold.

7. The method according to claim 6, wherein the transmitting the service data by using the allocated transmission resource comprises:

sending data corresponding to the transmission resource that belongs to the non-first resource in the service data to a terminal using a carrier in a licensed spectrum when the transmission resource allocated to the service data comprises the transmission resource that belongs to the non-first resource;

sending data corresponding to the transmission resource that belongs to the first resource in the service data to a terminal using the carrier in the unlicensed spectrum when the transmission resource allocated to the service data comprises the transmission resource that belongs to the first resource, and the first resource is the carrier in the unlicensed spectrum;

sending data corresponding to the transmission resource that belongs to the first resource in the service data to a wireless access point of the WLAN so that the wireless access point forwards the data to a terminal when the transmission resource allocated to the service data comprises the transmission resource that belongs to the first resource, and the first resource is the transmission resource provided by the WLAN; or instructing the secondary eNodeB to establish a bearer between the secondary eNodeB and a terminal, and sending data corresponding to the transmission resource that belongs to the first resource in the service data to the secondary eNodeB so that the secondary eNodeB forwards the data to the terminal by using the established bearer when the transmission resource allocated to the service data comprises the transmission resource that belongs to the first resource, and the first resource is the transmission resource provided by the secondary eNodeB.

8. The method according to any one of claims 5 to 7, wherein the receiving quality of service (QoS) information of service data comprises:

receiving the QoS information sent by a core network device; or receiving the QoS information forwarded by a core network device by using a primary eNodeB.

* * * * *